United States Patent
Stark

(10) Patent No.: US 7,158,951 B2
(45) Date of Patent: Jan. 2, 2007

(54) DYNAMIC COMPUTER SOFTWARE FOR TRADING SECURITIES

(76) Inventor: Thomas Stark, 8 Summit Dr., Lebanon, NJ (US) 08833

(*) Notice: Subject to any disclaimer, the term of this patent is extended or adjusted under 35 U.S.C. 154(b) by 393 days.

(21) Appl. No.: 10/254,892

(22) Filed: Sep. 25, 2002

(65) Prior Publication Data

US 2004/0059662 A1 Mar. 25, 2004

(51) Int. Cl.
*G06Q 40/00* (2006.01)
(52) U.S. Cl. .................. 705/37; 705/36 R; 705/35
(58) Field of Classification Search .......... 705/35–37
See application file for complete search history.

(56) References Cited

U.S. PATENT DOCUMENTS

| | | | | |
|---|---|---|---|---|
| 6,014,643 | A * | 1/2000 | Minton | 705/37 |
| 6,029,146 | A * | 2/2000 | Hawkins et al. | 705/35 |
| 6,247,000 | B1 * | 6/2001 | Hawkins et al. | 705/37 |
| 6,263,321 | B1 * | 7/2001 | Daughtery, III | 705/36 |
| 6,269,346 | B1 * | 7/2001 | Cristofich et al. | 705/37 |
| 6,321,212 | B1 * | 11/2001 | Lange | 705/37 |
| 6,505,174 | B1 * | 1/2003 | Keiser et al. | 705/37 |
| 6,687,681 | B1 * | 2/2004 | Schulz et al. | 705/36 T |
| 6,709,330 | B1 * | 3/2004 | Klein et al. | 463/9 |
| 2002/0059127 | A1 * | 5/2002 | Brown et al. | 705/36 |
| 2002/0128950 | A1 * | 9/2002 | Wu et al. | 705/37 |
| 2005/0137962 | A1 * | 6/2005 | Penney et al. | 705/37 |
| 2005/0171892 | A1 * | 8/2005 | Naas et al. | 705/37 |

FOREIGN PATENT DOCUMENTS

WO    WO 02/37380 A1 *  5/2002
WO    WO 2005/109274 A2 * 11/2005

OTHER PUBLICATIONS

Oppenheimer (San Jose Mercury News) (Feb. 15, 1987) The Power of Program Trading, p. 1E.*

* cited by examiner

*Primary Examiner*—Hyung Sub Sough
*Assistant Examiner*—Narayanswamy Subramanian
(74) *Attorney, Agent, or Firm*—McCarter & English, LLP

(57) ABSTRACT

The invention relates to a computer-implemented method of trading securities, a computer-readable medium carrying one or more sequences of instructions for trading securities, and a computer program product for use with a graphics display device. The program determines a reference price for the security, monitors the value of the security over time, and receives an input corresponding to a differential in the value of the security. A trigger price is determined for the security as a function of the differential and the reference price. The program liquidates the security after determining that the value of the security reaches or passes the trigger price in a first direction. After liquidating the security, the program automatically acquires at least one position in the security when the value of the security reaches or passes the trigger price in a second direction opposite to the first direction.

72 Claims, 19 Drawing Sheets

US 7,158,951 B2

DYNAMIC COMPUTER SOFTWARE FOR TRADING SECURITIES

FIELD OF THE INVENTION

This invention relates to a computer implemented method, a computer-readable medium carrying instructions, and a computer program product, all for trading securities.

BACKGROUND

Trading stock can be performed in a variety of ways. One way to trade stock is to hire a broker who will perform the transactions on the client's behalf. Another manner to trade stock is to open an on-line account and trade stock using an on-line program found on the Internet. A third way is to purchase a computer program that permits the user to trade stock through use of a brokerage service. These examples are just three ways stock can be traded.

After a stock is purchased, the owner of the shares of stock usually desires to monitor the value of the shares. This is done in an effort to both avoid a significant loss financially should the value of the stock decrease and to increase profit should the value of the stock increase. In either case, once the stock is purchased, it is important to know how the value of it fluctuates, if at all.

When trading long, a stock's value decreases, many owners of the stock desire to sell their shares in order to avoid losing more money in the event that the stock's value continues to decline further. Once the stock is sold, either through a broker or through a computer program, the transaction is generally over. This means that if shares of stock are sold and then soon thereafter the stock's value increases to an amount where the individual may have wanted to repurchase the shares, the individual must instruct the computer program or broker to purchase a specific number of shares. Put another way, when the stock's value rises, the computer program or broker generally will not automatically repurchase shares that were previously sold. Thus, separate steps are required, both of which must be initiated by the individual. As a result, the individual could not only lose money by selling the shares of stock at a loss, but he could also fail to make money because he did not repurchase the stock when the stock's value began to increase past his previously sold price.

When purchasing stock through the use of a computer, when the user wishes to buy a stock, he or she generally instructs the program being used to buy the stock. The price at which the user is willing to purchase the shares of stock is referred to as the ask price. Then, if the user wishes to sell the stock he can do so, again by instructing the computer to do so. These buying and selling transactions are generally performed as two separate transactions, and the user must initiate both. There are at least three different methods to trade stock long, short, or both. Trading long occurs when an individual owns shares of stock and sells them later when the per share value has increased in price in order to generate a profit. An investor who sells stock short borrows shares from a brokerage house and sells them to another buyer. Proceeds from the sale go into the shorter's account. He must buy those shares back (cover) at some point in time and return them to the lender. When an individual sells short, he is anticipating that the value per share of stock is going to decrease which would result in his being able to earn a profit when he repurchases the shares and "returns" them to the rightful owner.

When trading long, a user can instruct a computer program of the current art to sell stock when the stock's value reaches a certain desirable amount. The value of a stock at any given moment is known as the bid price. However, once the stock is sold, the program no longer monitors the value of the stock that was just sold. As a result, if the stock was sold and declined in value, the user limited his loss by selling the stock. If however, the stock's value increased at least back to the price at which it was sold, the user essentially lost money because he could have repurchased the stock as soon as the stock's value equaled the price at which it was previous sold. Similar considerations apply when stock is traded short.

Thus, there is the need for a computer program that continuously monitors the value per share of stock after shares are sold and then automatically repurchases the shares when the value of the shares just sold reaches a specified amount. In other words, there is a need for a dynamic program for trading stock.

SUMMARY OF THE INVENTION

One aspect of the invention is a computer-implemented method of trading a position in a security, such as a stock. The value of the security is monitored by the associated computer program. A determination of a reference price for the security is made. An input is received which designates a differential for the computer to use when calculating the trigger price; the trigger price is the value used to liquidate and acquire positions in a security. The program liquidates, or gets out of, a first position in the security when the value of the security reaches or passes the trigger price moving in a first direction. After liquidating the first position, the program acquires, or gets into, a second position in the security when the value of the security reaches or passes the trigger price moving in a second direction opposite to the first direction. The position acquired or liquidated depends on whether the user is trading long or short.

Another aspect of the invention is a computer-readable medium carrying one or more sequences of instructions for trading a position in a security. Execution of the one or more sequences of instructions by one or more processors causes the one or more processors to perform the steps of monitoring the value of the security over time; determining a reference price for the security; receiving an input corresponding to a deferential in the value of the security; determining a trigger price for the security as a function of the differential and the reference price; outputting instructions to liquidate a first position in the security when the value of the security reaches or passes the trigger price moving in a first direction; and outputting instructions to acquire a second position in the security when the value of the security reaches or passes the trigger price moving in a second direction which is opposite the first direction. The position acquired by liquidated depends, of course, on whether the user is trading in the long or the short market.

Yet another aspect of the invention is a computer program product for use with a graphics display device. The computer program product comprises a computer usable medium that has computer readable program code. Included in the computer readable program code are means monitoring the value of the security over time; means determining a reference price for the security; means for receiving an input corresponding to a deferential in the value of the security; means for determining a trigger price for the security as a function of the differential and the reference price; means for outputting instructions to liquidate a first position in the security when the value of the security reaches or passes the trigger price moving in a first direction; and means for outputting instructions to acquire a second position in the security when the value of the security reaches or passes the trigger price moving in a second direction which is opposite the first direction.

The invention thus is a dynamic computer software program and related media and systems, for trading a position in a security that does not suffer the shortfalls of the prior art.

DESCRIPTION OF THE PREFERRED EMBODIMENT

In general terms, the invention involves a computer-based system with suitable programming to allow a user to trade one or more securities in response to certain market conditions or at certain times. The securities traded by use of the invention can be of any marketable type, such as, but not limited to, stocks, bonds, options, and derivatives. Thus, although the invention has been described herein with reference to the trading of stock, it is understood to pertain more generally to any type of marketable security.

Figure 1:
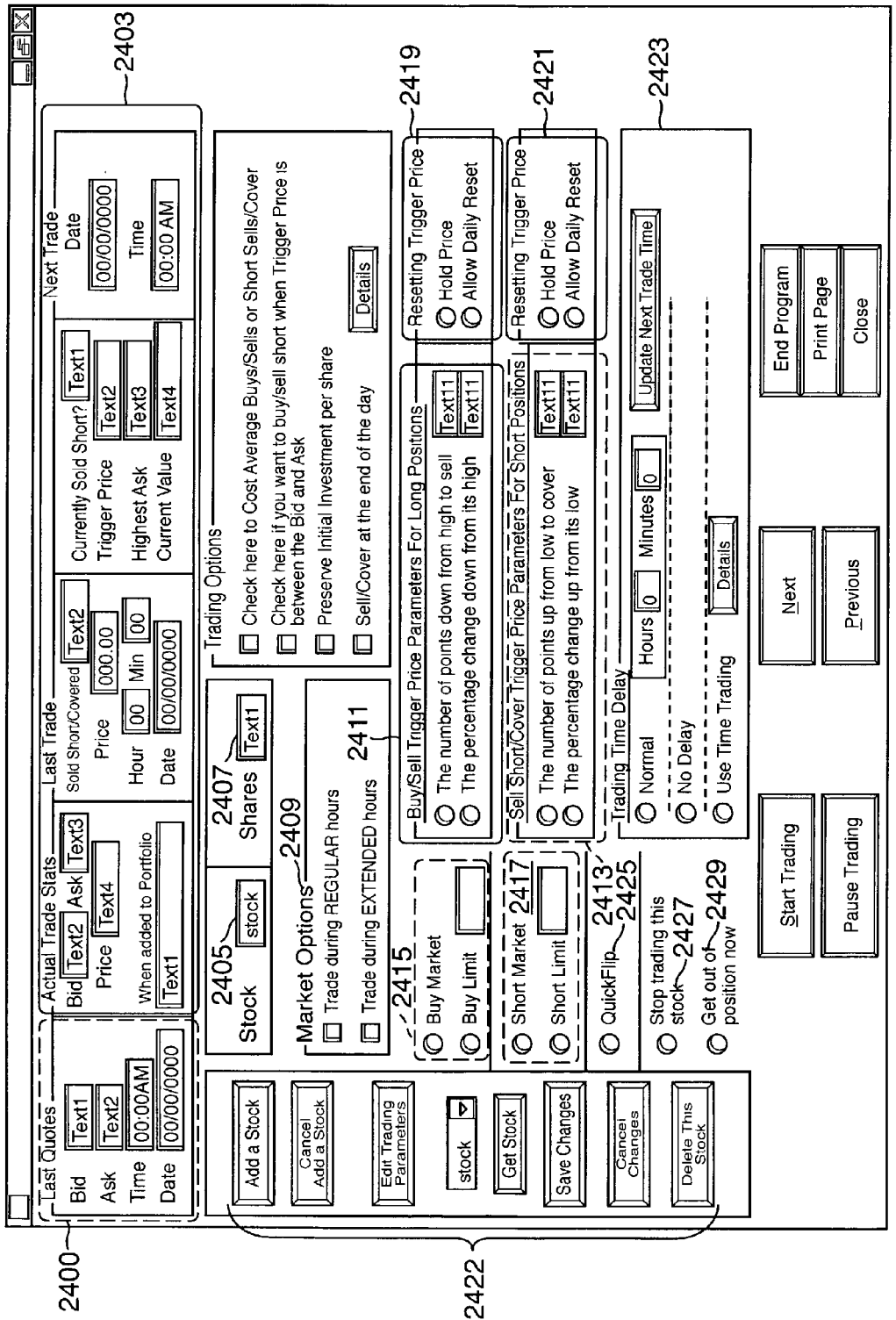
FIG. 1 is one screen of the graphical user interface for the invention.

FIG. 1 shows a graphical user interface for a computer program for dynamically trading stock. The program keeps track of the value of the stock in real time or near real time by interfacing with a suitable database, stock quote service, computer, or other means for monitoring the value of the stock. The program displays such information in field 2400. The program also interfaces with suitable providers or services to trade the stock. The stock is selected preferably from a file list maintained by the user or by entering the appropriate symbol in field 2405. As shown in field 2403, the program keeps track of and displays information related to the stock of interest, including the actual trade statistics, the last trade, the next trade, and the status of the current trade for the selected stock. The user can enter the number of shares in field 2407 that he or she wants to monitor.

If the user wishes to trade in the selected stock, the program includes suitable routines for allowing participation in trading long or trading short. The appropriate routine is selected by checking the corresponding box in field 2415 or 2417.

An important feature of the program is the so-called trigger price, and the various programming routines and automatic trading decisions keyed off of the trigger price. In general terms, the trigger price is calculated by taking a reference price and applying a change in value, or a "differential," to the reference price. The differential can be either a set number of points or a percentage of the reference price. The reference price is the highest asking price when trading long and the lowest bid price when trading short.

If the user chooses to trade long the user checks the box in field 2415 and then specifies the buy-sell trigger price parameters for long positions 2411. Similar options are available for trading short in field 2413.

As explained in more detail below, the program uses the trigger price calculated by the program during monitoring of the stock or stocks of interest. The program automatically initiates buying or selling of shares in response to the market achieving such trigger price. The trigger price is adjustable by the user or through various programming routines, such as the reset options, explained in more detail below, and such programming routines are activated by selecting appropriate boxes in fields 2419 and 2421.

The program includes routines for the user to set up other automatic, dynamic trading events related to selected stocks. For example, the user is able to select the frequency at which the program checks the various parameters that determine whether trading should occur. This feature, referred to as the "trading time delay," is configured using area 2423. In such area the user can specify the number of hours and minutes for the trading time delay. The program monitors the market prices of the selected stock(s), but the program will not perform an indicated trade until the specified time has elapsed. By way of example, this means that if an hour and a half has been specified by the user in the appropriate areas of field 2423, such delay shall apply between every transaction that the program would otherwise perform for the stock(s) being monitored.

Area 2423 allows the user to specify exact times of day at which transactions are to be performed; such option is referred to as the "custom delay option." For example, the user can specify in suitable locations in the program to trade at 9:45 a.m., 11:30 a.m., 12:00 p.m., 12:15 p.m., and 3:15 p.m.

Specifying a trading time delay is optional. If no delay is specified, the program will perform transactions upon demand or when appropriate trading trigger price parameters have been satisfied, allowing the trading to occur automatically.

Some owners of stock prefer to trade outside the normal business hours of the stock market. The program allows trading during such extended hours by appropriate designations in area 2409.

In view of the foregoing, the computer program monitors the value of a user's stock or stocks and has suitable programming to continue monitoring such stock or stocks even after the regular market buying or selling has occurred. The user is able to select trigger prices either as a number of points or a percentage change, and such trigger prices determine trading of the stocks, depending on what transactions previously occurred, as well as the direction the market has moved since such previous transactions were made. As discussed above, the trading response to the trigger price may be controlled or adjusted by the user by specifying trading time delay or by specifying the hours in which the trades should occur (normal or extended hours).

The computer program includes various additional features for the user to manage his or her stock portfolio. With reference to the graphical user interface of FIG. 1, the user's portfolio can be revised by selecting various buttons in decision field 2422, the function of which is apparent by the labels on such buttons.

Similarly, this program permits various trading options to be specified in the context of the trigger-price-driven trading discussed previously. For example, the user can select a price at which to enter a position on a particular stock by assigning a purchase or sell short price for such stock either for trading long or short, respectively. Such price is designated by the user in the appropriate area of field 2415 in trading long and 2417 for trading short, and is referred to as a buy limit or a short limit, respectively.

Another program feature, referred to as QuickFlip, activates suitable routines in the program so that the trading strategy alternates between trading long and trading short. The user activates this program feature by selecting the corresponding box in field 2425.

Having described the features of the program with reference to an exemplary graphical user interface shown in FIG. 1, it will be appreciated that the program can be operated in a variety of different manners to manage stock portfolios in a variety of different ways, depending on the selections of the user, including the stock, the trading options, the trigger price, the trading time delay, and the various other user-selectable options discussed previously. These various modes of operation are illustrated schematically with flow charts in FIGS. 2–6. It will be appreciated by those skilled in the programming arts that the flow charts of FIGS. 2–6 are but one preferred embodiment for accomplishing the functions and features of the program for dynamically trading stock.

Figure 2:
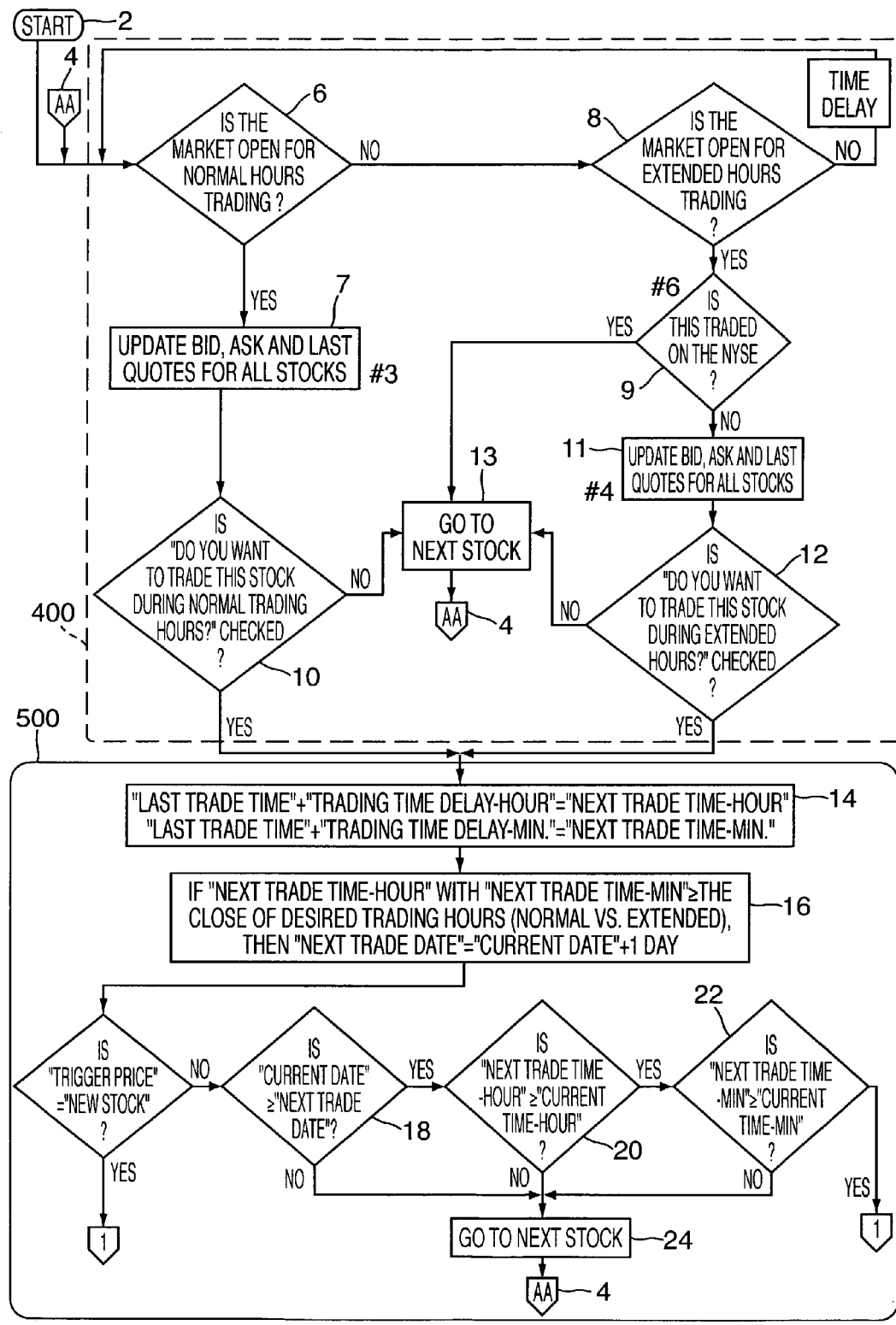
FIGS. 2–6 are flow-charts representing the computer program.
Figure 3A:
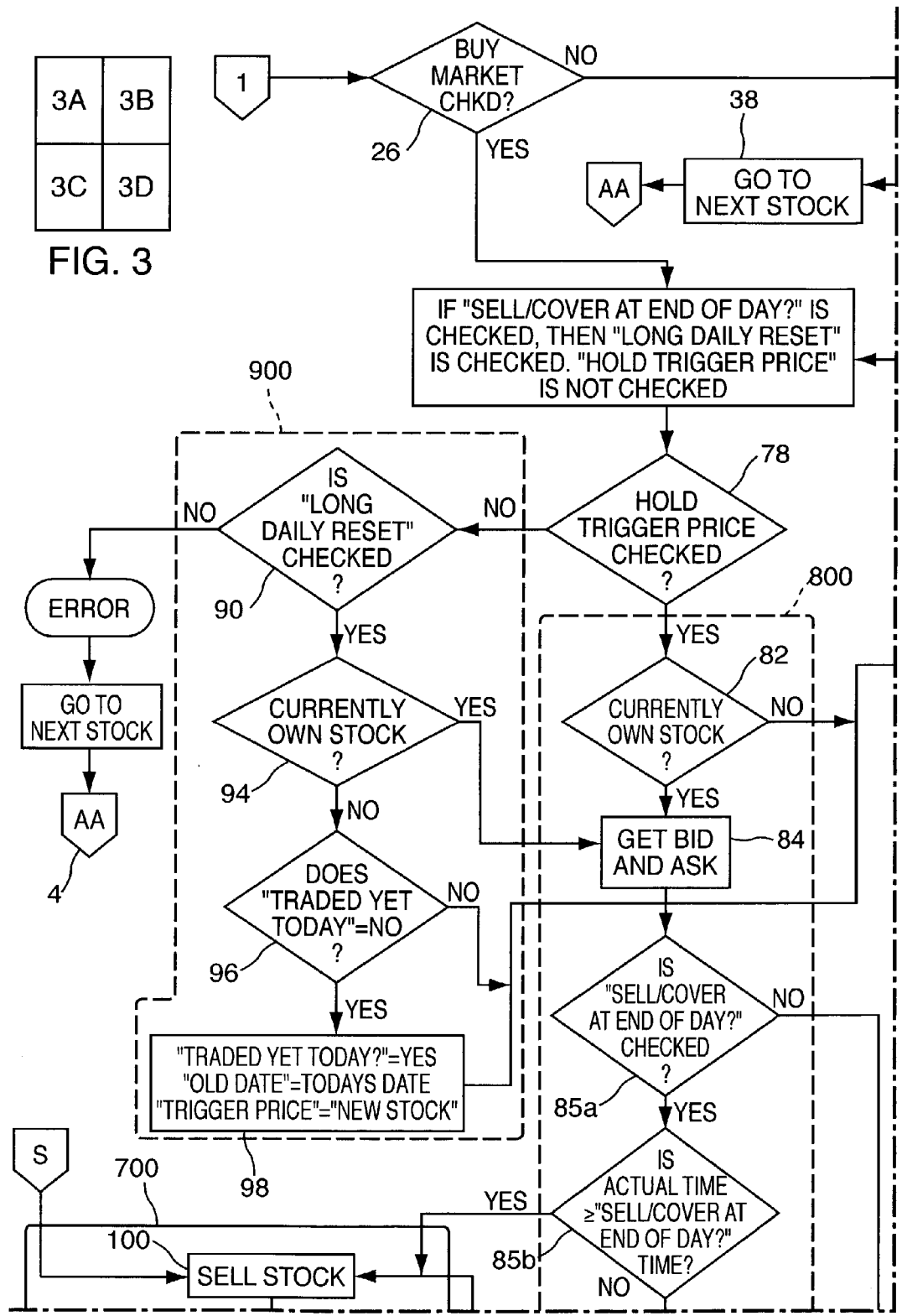
Figure 3B:
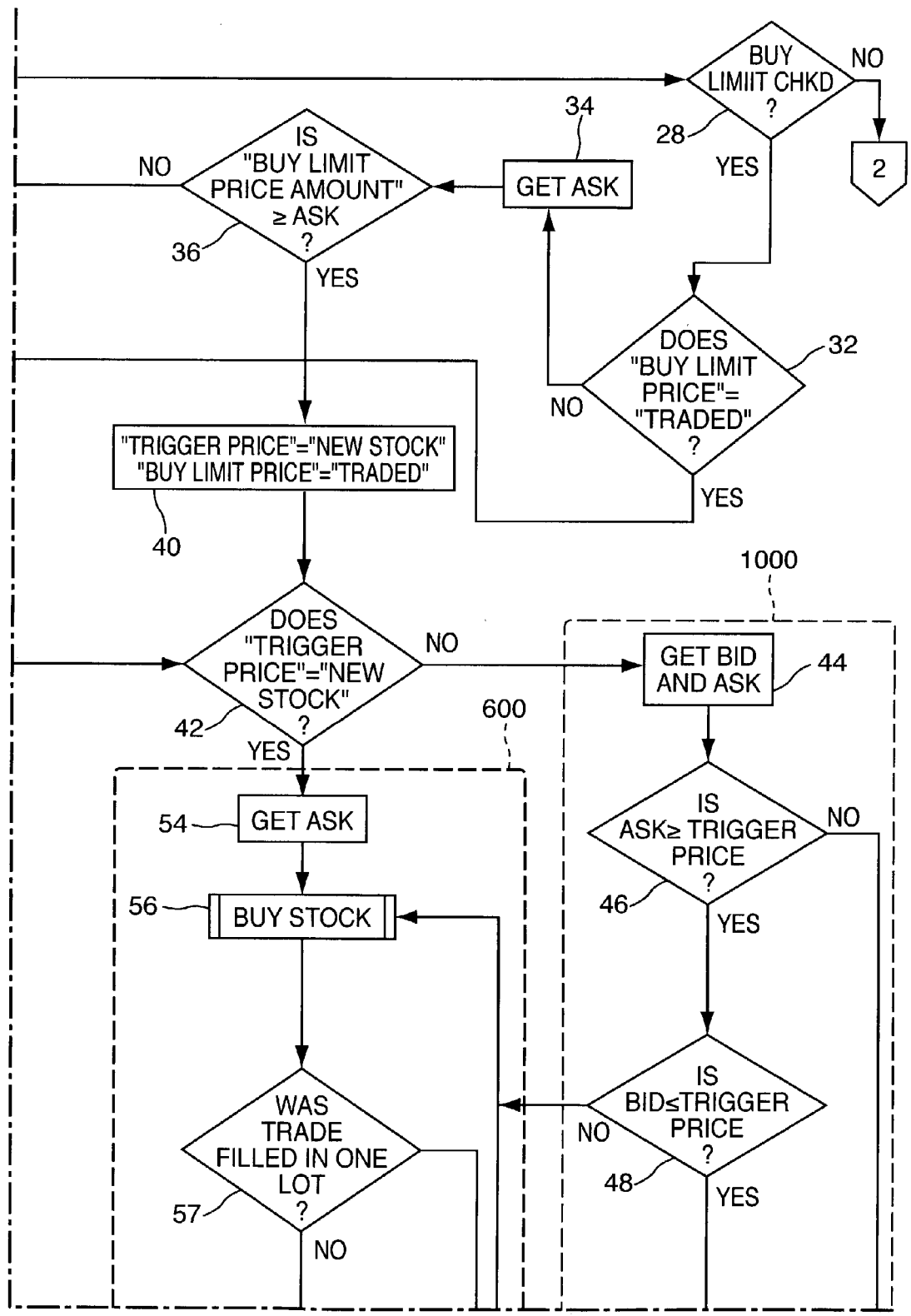
Figure 3C:
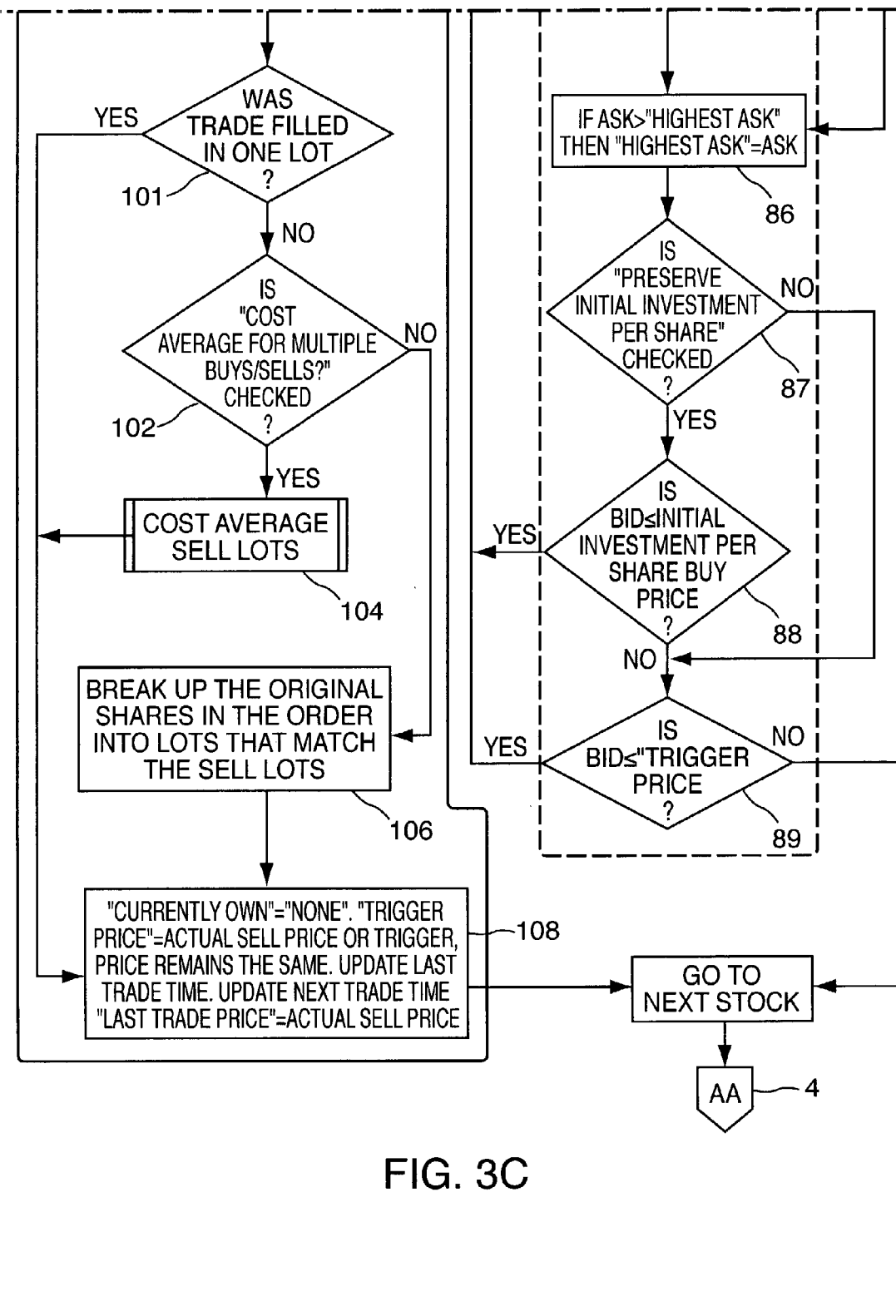
Figure 3D:
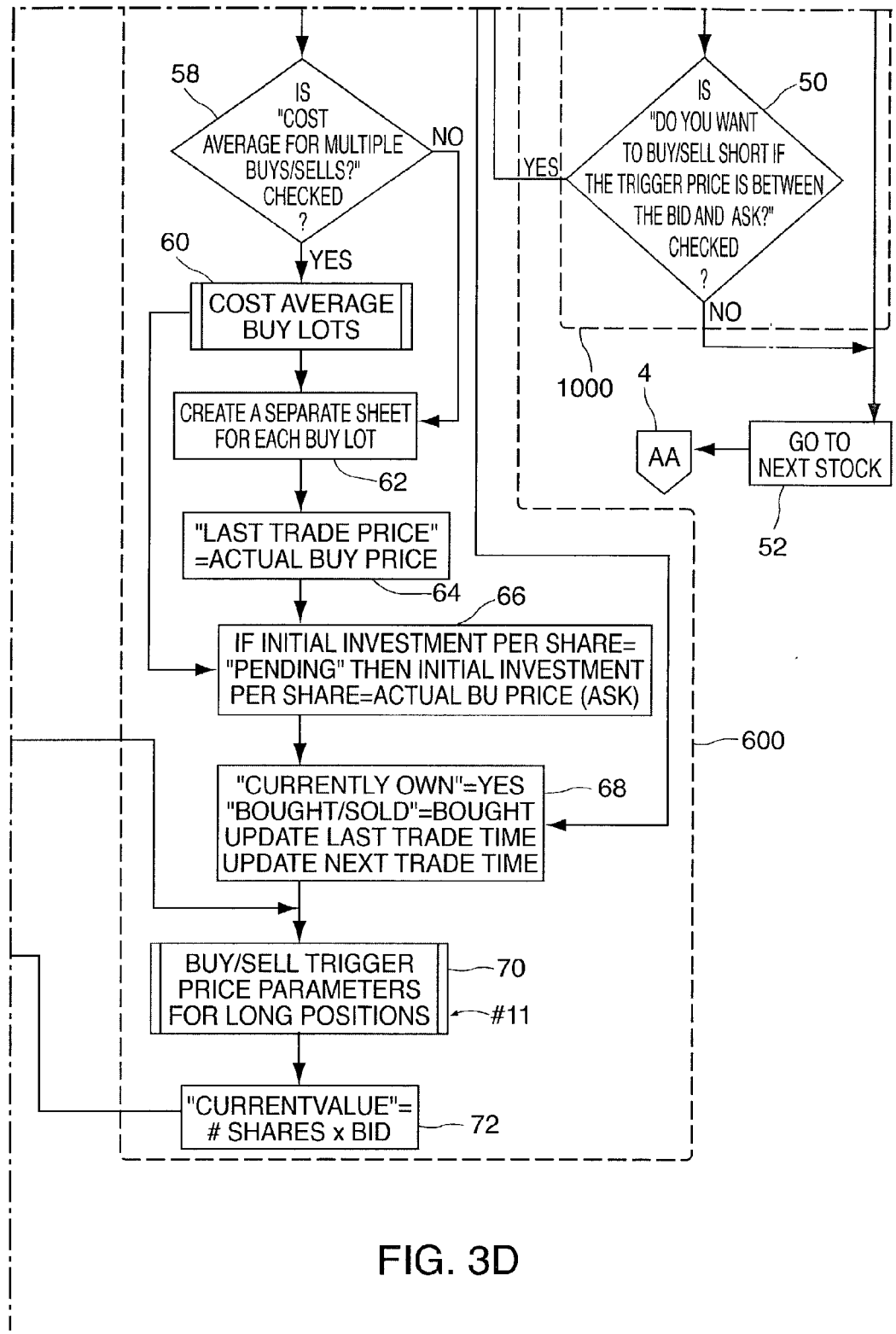

Referring now to FIG. 2, the program includes suitable routines shown by block 400 for determining whether to trade during normal hours or extended hours. Once such a determination is made, the program includes suitable routines, shown in decision block 500, for determining whether the appropriate amount of time, if any, has elapsed between the last trade of the selected stock or stocks and the current date and time. If not, as set forth in the programming blocks of decision block 500, the program moves to the next stock or stock to be evaluated.

If the user-inputted parameters are such that it is time to look at the selected stock for trading, the program proceeds to computer element 1, and follows the logic tree or programming blocks shown in FIGS. 3A–3D. Again in general terms, as shown in FIGS. 3A–3D, the program checks to see whether the user wishes to participate in long or short trading by entering the market at the current price (market price) of the stock or to begin trading by using the buy limit or short limit option feature discussed previously.

The various programming steps for determining which trading action is to take place are detailed in decision areas 600, 700, 800, 900, and 1000. In these decision areas, as will be detailed subsequently, programming routines not only compare the trigger price to various ask and bid prices, but the trigger price is adjusted and recalculated under certain circumstances, to enable the user to get back into the market of a particular stock under advantageous conditions, as determined by the program.

If the user has selected the various parameters for participating in trading long and for using a trigger price to determine selling and repurchasing of stock, then the program will sell such a stock when its price decreases to the trigger price or below assuming that the stock was previously bought. Significantly, the program continues to track the stock price that was sold in the above transaction and will repurchase such stock if its value increases to equal or exceed the trigger price at the next trading time. The program repeats analogous actions after the stock was purchased to determine the need and time to sell. The continued monitoring of the stock price after it has been continuously bought and sold, and the subroutines that allow for repurchasing and selling of such stock when it meets or exceeds the trigger price, renders the stock-trading program dynamic.

The programming routines illustrated in FIGS. 2–6 include subroutines which automatically adjust the trigger price originally selected by the user, under certain conditions, and the trigger price is determined through program calculations using trading parameters, such as those accessed through the graphical user interface in FIG. 1.

In the event that the user is not trading long, the program logic continues to perform the various subroutines shown in FIGS. 4A–4D, as indicated. The program determines whether the user has selected to participate in trading short, which selection the user would have made in area 2417 of the graphical user interface of FIG. 1. If so, the program makes use of bid and asking prices and compares such prices to the inputted differential to be used when determining the trigger price when participating in trading short in a manner similar to, but generally conversely to, the calculations performed with reference to trading long. Decision areas 1200, 1300, 1400, 1500, and 1600, and the computer programming blocks contained in such decision areas, correspond to various subroutines for evaluating the trigger price in relation to the bid and asking price and, as a result of such evaluation, determining what, if any, trades should be made when trading short.

The program executes the various steps shown in FIGS. 5A–5D when the user has selected the QuickFlip option by checking the appropriate box in the graphical user interface in area 2425 (FIG. 1). The QuickFlip operations involve resetting certain parameters relating to the bid and ask prices, as well as those related to the trigger price as shown in the programming blocks of area 1900. Decision areas 1700, 1800, 2000, 2100, and 2200 are involved in updating the various trading parameters to accomplish the alternating long and short trading positions of this feature. In particular, if the user is in a long position and the stock price falls, which is an example of moving in a first direction, to the trigger price, normally the stock is sold and the user is out of the position. With QuickFlip activated, the user not only closes his long position by selling the shares, but also immediately goes into a short position by selling short. The trading parameters that determine the trigger price for both long and short positions are enabled because both positions are used and the trading time delay feature is also used as described. This same type of scenario takes place for the conversion of short to long positions.

Figure 7:
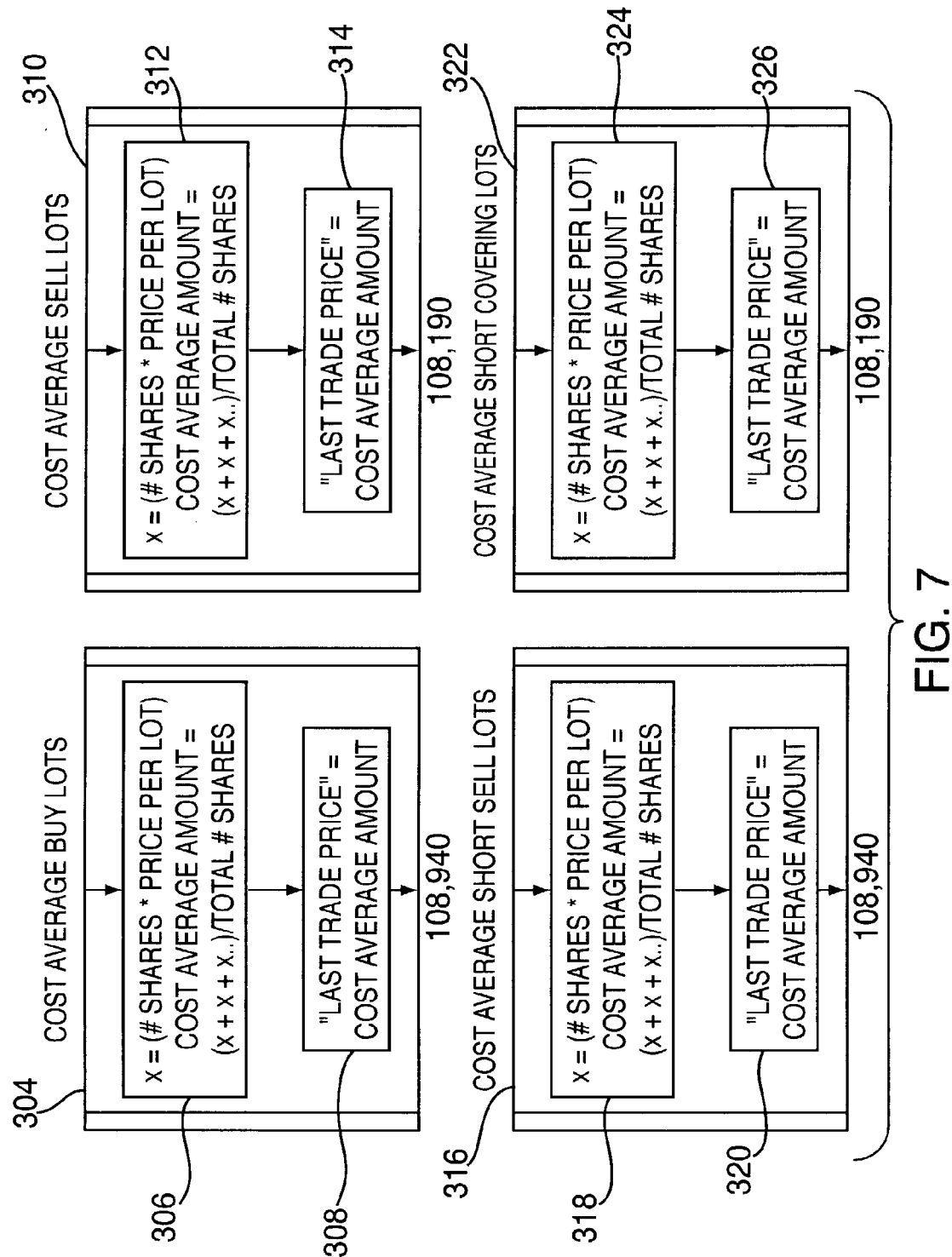
FIG. 7 shows the different methods the inventive computer program uses to calculate statistics for the stock that was traded.

When QuickFlip is not selected, the program can be instructed to stop trading the stock or close the position of the stock (if currently in a position) by selecting either field 2427 or 2429, respectively, in the graphical interface. FIG. 7 shows the programming steps that take place as a result of the user's selection of either field 2427 or 2429.

Figure 6:
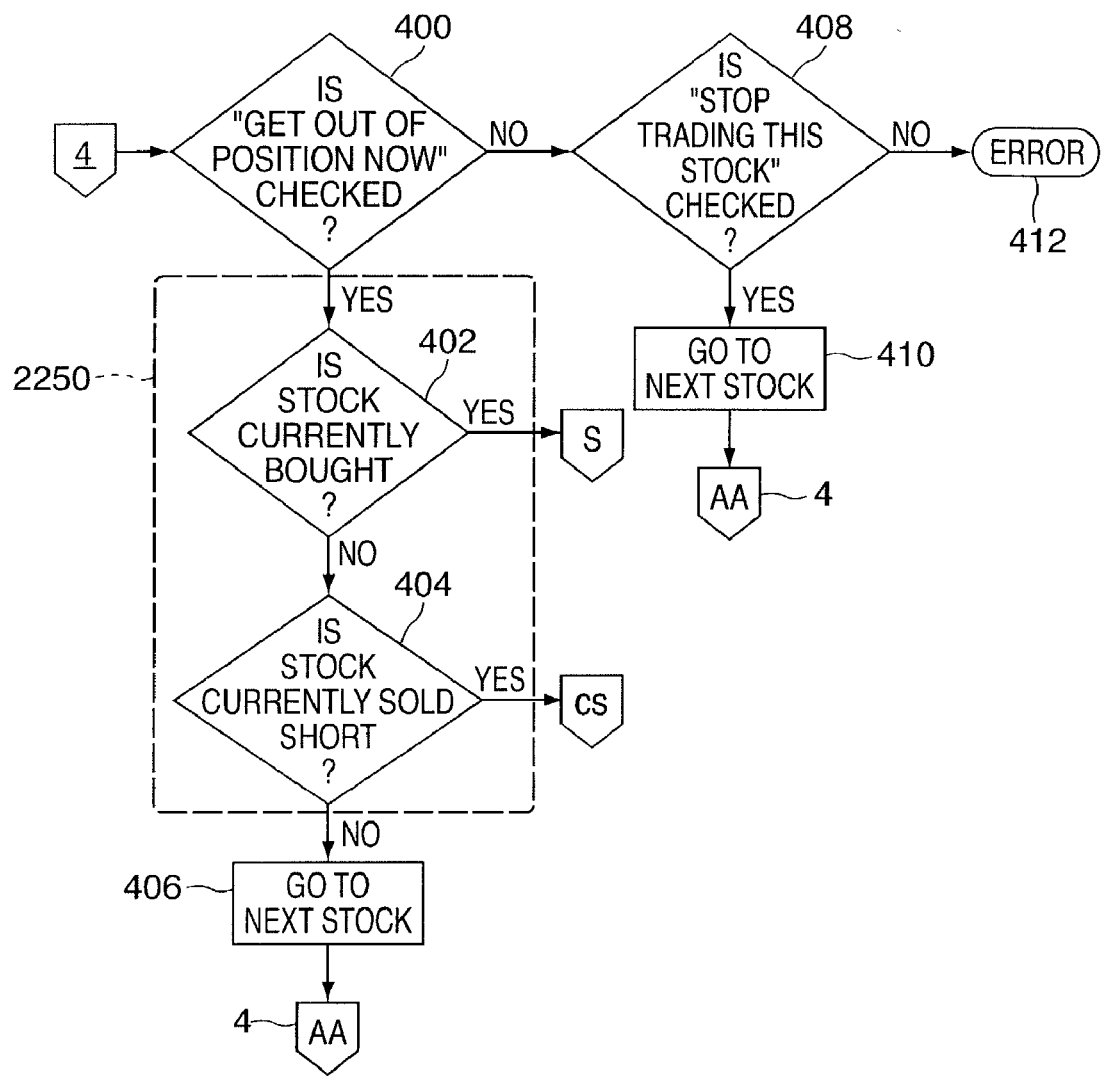

The calculations of the programs to cost average buy lots, cost average sell lots, cost average short sell lots, and cost average covering lots are shown in computer programming blocks 304, 310, 316, and 322, respectively, of FIG. 6.

Having discussed the overall structure of the subroutines of the computer program, the corresponding computer operations are now illustrated with the benefit of certain working examples or hypotheticals. Suppose a user purchases stock for $20.00 (in this case, the reference price), and wishes to sell it when the stock declines by 5 points (the differential) to $15.00. Under such scenario, the trigger price is $15.00, and the differential of 5 would be inputted into area 2411 of the graphical user interface in FIG. 1. If, at the appropriate trading time, the program determines that the stock price or value has decreased to less than or equal to $15.00 (in this case, the stock's value has moved in a first direction by decreasing), then the program will automatically sell the stock at such value.

The program continues to monitor selected stocks, including the one sold in the hypothetical above, so that, if at the next trading time its value has risen to, risen above, or maintained the $15.00 trigger price (in this case, the stock's value has moved in a second direction by increasing or no longer decreasing), the program will automatically execute instructions to repurchase the shares that were previously sold. This repurchasing feature allows the user to capture the increasing trend of a stock and thus offset any previous losses by capturing gains as the stock continues to rise beyond the 5-point spread, in this example. Optionally, the program can be modified so that the user has the option of repurchasing at least one share of the-stock instead of repurchasing the same number of shares previously sold.

When the trigger price is based on a percentage of the stock value, the calculations above are similar. For example, if the sell short/cover trigger price parameter for short positions is 50% for a stock valued at $20.00, then the stock will be sold when its value declines to a trigger price of $10.00, which is 50% of the value at purchase of $20.00. Then, in order for the stock to be repurchased, the stock must attain a value equal to or above the previously sold price (trigger price).

As seen from the above, the trigger price is used to both get into, that is "acquire," or get out of, that is "liquidate," a stock position whether such "value" is expressed when trading long or short. As such, although the user designates only the points or percentage difference for a stock, such designation generates a trigger price for buying and selling if the user is trading long, or selling short and covering if the user is trading short.

Thus, the user specifies a differential in the value of the stock so that the program can determine the trigger price. When the value of the security reaches or passes the trigger price moving in a first direction, the program liquidates the first position in the stock. A second position in the stock is acquired when the value of the stock reaches or passes the trigger price moving in a second direction which is opposite to the first direction.

If the user is trading long, the feature of adjusting or resetting the trigger price is activated when the stock's value increases beyond the price at which it was purchased by the user. In other words, the program determines the highest asking price or "high" of a stock (the reference price) and uses such determination to reset the trigger price accordingly. Referring back to the previous example, if the user has specified a 5-point "spread" for the trigger price, and the stock purchased for $10.00 increased in value to $100.00 per share, then the recalculated trigger price would be based on the new stock value of $100.00 (the highest ask price), which would be 5 points down from such high, that is, $95.00 per share.

The determination of the reference price (not shown in the figures), which is highest asking price or "high" of the stock when trading long, can be updated with any suitable granularity, including updating daily, at intervals corresponding to the trade delay discussed previously, or continuously. It will be appreciated that one skilled in the art can create suitable programming to vary the intervals at which the highest price for the stock is determined and/or the trigger price is recalculated accordingly.

The program includes various other options to reset the trigger price, including resetting the trigger price at the beginning of each day based on the stock's asking price, varying the trigger price during the course of the day based on fluctuations of the stock's value, or other appropriate resetting options. The option of resetting the trigger price at the beginning of each day allows the user to take advantage of what is referred to as "Allow Daily Reset." With "Allow Daily Reset," the user can have the program automatically re-enter a stock position at the start of a new trading day which he had been formally sold out of (or covered), at a time in the past, because the trigger price had been reached. This is done by obtaining a new asking price (or bid if the user is trading short), and getting into the position with a new trigger price established by, but not limited to, the original trading parameters. Bid and ask prices are both routinely obtained together since each are used by different subroutines in the program.

By way of example, when the user is in a long position, suppose the trigger price had been indicated by the user to be 5 points below the highest asking price. Suppose further that all shares of the associated stock were sold the previous day when the trigger price was $20.00. Suppose still further that on the following day, the asking price for such stock opened at $15.00, because its value continued to fall after the user's shares were sold at $20.00. If the daily reset of the trigger price option has been selected after the stock was repurchased, then the trigger price will be recalculated by taking the opening price of $15.00 less 5 points, making the trigger price $10.00. Under such a scenario, if the stock's value continues to fall from its opening so that it decreases from $15.00 to $10.00, then the program will sell the stock when the trigger price of $10.00 is achieved. This feature allows the user to reenter the market after all shares have been sold, because the shares have fallen to a low enough value to warrant market reentry. It should be noted that the foregoing use of the trigger price in trading long to reset the trigger price and repurchase shares does not apply unless the user has previously exited the market and owns no shares of the stock. In other words, in the preferred embodiment, when trading long, the reset trigger price option is used to reenter the market after all the user's shares have been previously sold in a declining market.

In staying with trading long, the program also includes suitable routines to perform in accordance with the following hypothetical. Suppose the user specifies a 10% decrease from the highest asking price as the "trigger price." Under such hypothetical, suppose the user purchases stock for $85.00 and its value increases over time. If the stock's asking price has increased to $250.00, the new trigger price is reset to be 10% less than the stock's value, in this case such trigger price being $225.00.

The resetting of the trigger price in such an increasing market further protects the user's gain from previous stock purchases. Referring back to the same hypothetical above, if the stock declines from a reference price of $250.00 to a value below $225.00, then the 10% trigger price will be activated, resulting in sale of the stock. If, however, the stock had been previously purchased at $85.00, as set forth above, then the user has still received gain from such sale, even though the stock began decreasing in price. If the trigger price had not been reset, but had remained at 10% down from the purchase price of $85.00, the user's gain would not have been realized.

The resetting of the trigger price continues for selected stocks on a daily basis, and through the trigger-price driven trading transactions discussed above, seeks to avoid losses and protect gains of the user.

The program of the current invention calculates stock values, that is the ask and bid prices for stocks, and compares them to trigger prices for stocks when trading short in the same way as it does for trading long described above, with suitable adjustments for the selling short and covering rules of trading short versus trading long. For example, instead of tracking the highest asking price, as in trading long, the lowest bid price is tracked in the short market.

The program can also include suitable routines that allow the user to not buy or sell short when the trigger price is between or equal to the bid price and the asking (i.e., ask) price. It also can include suitable routines that the user may not sell or cover when the trigger price is between or equal to the bid and ask prices. Additionally, suitable routines may also be found in the program to modify the trigger price calculations so that the trigger price becomes an order to trade under the following scenarios: (1) after a user-specified gain has been reached; (2) when a stock's value reaches its 50 day, 100 day, or other moving averages; (3) when a stock's value reaches a certain indicator such as Price/Earnings ratio or any other useable indicator utilized for trading stocks; (4) when a particular trade volume has occurred whether or not in conjunction with other indicators or events such as price movement; and (5) before, on, or after a particular date, such as, but not limited to, the day a company's earnings announcement has occurred. Furthermore, the user may have the option of directing the program to select whichever trigger price calculation (1–5) occurs first.

The program includes suitable routines, set out schematically in FIGS. 2–6, for accomplishing trading during extended hours. When extended trading is to be used, there are no market orders for prices. The user puts in a limit order. He states the price in which he is willing to buy or sell the stock and a third party states how much he or she is willing to buy or sell the stock for. A company then matches up the user and the third party so that the transaction can be completed. The user is able to select whether to trade only during extended hours. The program contacts a remote computer and has suitable interfaces to obtain the third-party information and to perform the trade.

The flow charts of FIGS. 2–6 correspond generally to the trading transactions in response to achieving trigger prices, as described above. Certain significant steps of the computer program in relation to such trading practices are now described with more detailed reference to the flow charts and the computer programming steps schematically shown therein. The calculations for trading long are generally shown in FIG. 3. The trigger price is generally calculated in computer blocks 84–89 in decision area 800 and in computer block 70 in decision area 900.

When the hold trigger price is not selected 78, area 2419, the program determines whether to get the bid and ask prices by performing the steps found in decision block 900. However, when long daily reset 90 located in area 2419 is selected and the user currently owns stock 94, the program proceeds through blocks 86 and 88, and then either through decision block 700 or 800. If the user does not currently own stock and the selected stock has not been traded yet today 96 then the program proceeds to block 42. If the stock has been traded today, then the old date equals today's date, the trigger price is for a new stock 98, and the program proceeds to block 42.

At block 42, the program determines whether the trigger price is for a new stock. If the trigger price is not for new stock, the program proceeds through the steps found in decision block 1000, where the stock is either traded or the next stock is looked at. Otherwise, if the trigger price is for a new stock, the program proceeds through decision block 600.

In decision block 600, shares of stock are bought 56 and the trade statistics are calculated. The program recalculates the trigger price at block 70. This permits the trigger price to vary throughout the day. In other words, allow daily reset was selected in area 2421. Either the "Allow Daily Reset" or the "Hold trigger price" in area 2421 can be selected in order for the trigger price to be adjusted when the price of stock rises.

However, if buy market is not selected 26 but buy limit is selected 28, in area 2415, and the buy limit price is for a traded stock 32, the program proceeds to block 78 to determine whether the user selected to hold the trigger price, area 2419. After block 78, the program continues to either decision block 800 or 900.

In decision block 800, when the user currently owns shares of the stock to be traded, the program obtains the ask and bid prices and proceeds to either decision block 700 or computer block 64 depending on whether the bid price is less than or equal to the trigger price 88. The stock is sold and statistics are calculated in decision block 700 moving along to the next stock. The trigger price is reset in block 64. Alternatively, if the user does not currently own shares of stock 82 in decision block 800, the program proceeds to block 42.

If decision block 900 is executed by the program and the user has selected long daily reset 90, area 2419, and currently owns the stock to be traded 94, the program proceeds to block 84 and either sells or keeps the stock. But, when the user does not currently own the stock to be traded 94, after performing the steps in block 96 and/or block 98, the program continues to block 42.

Figures 4, 4A:
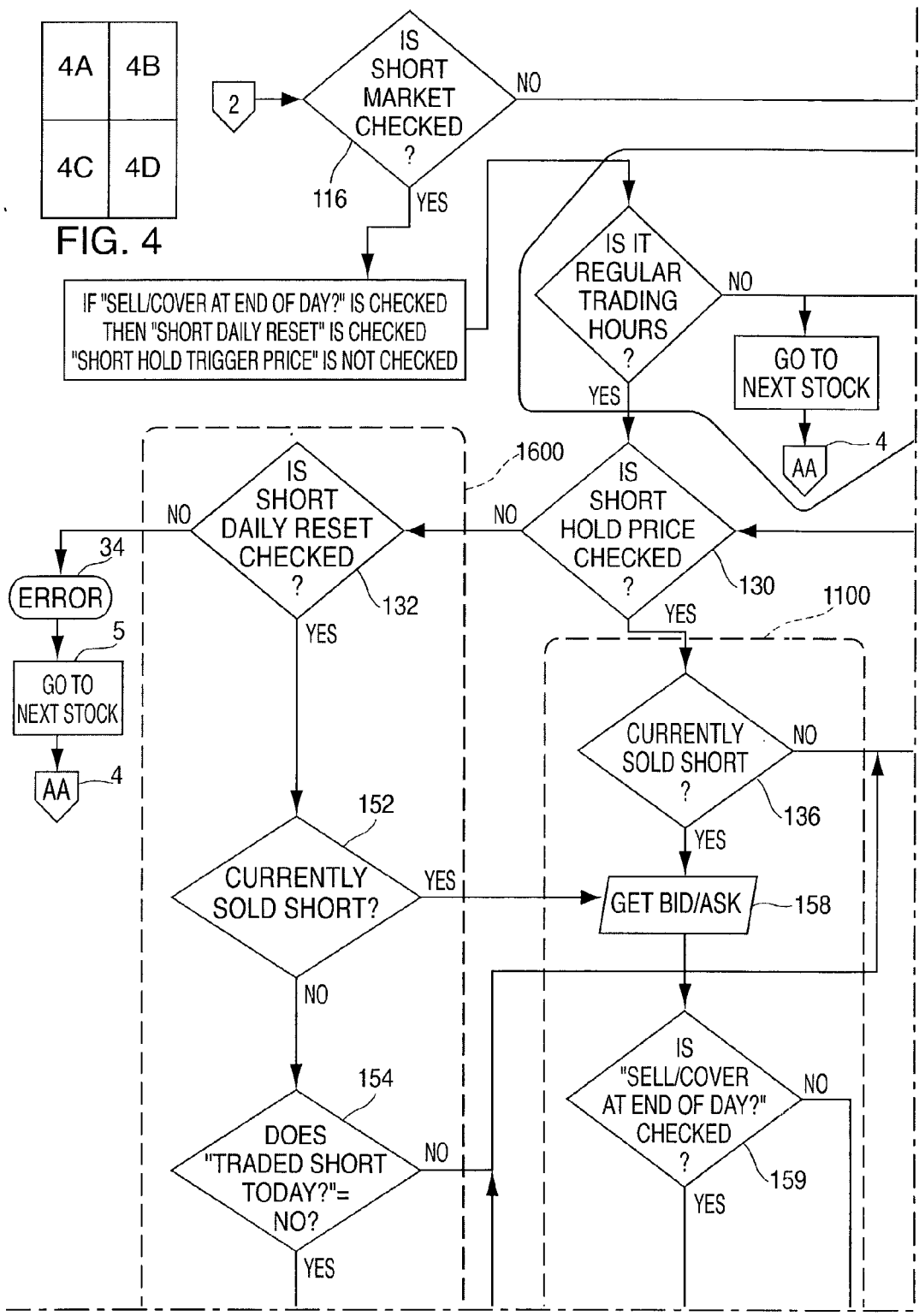
Figure 4B:
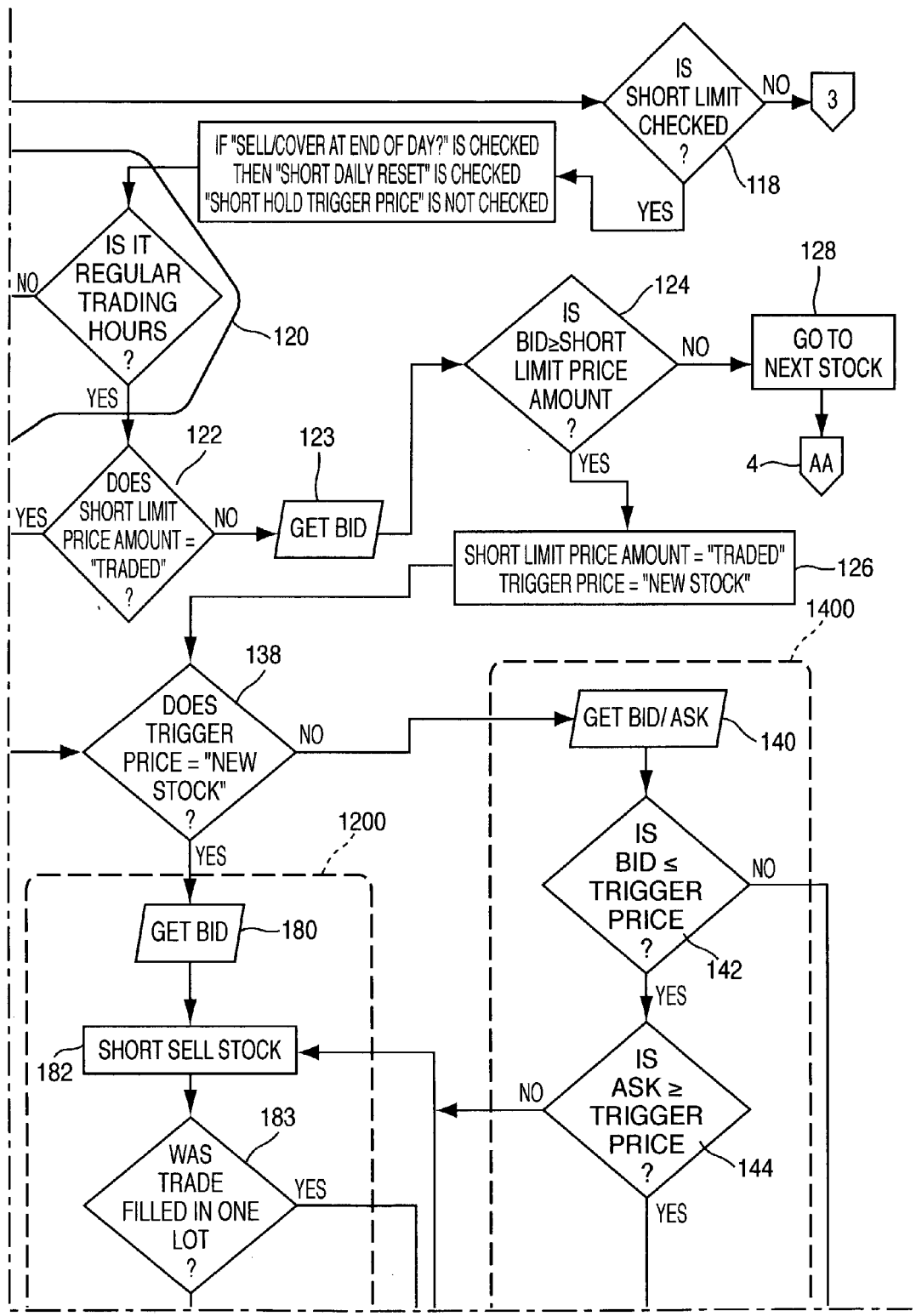
Figure 4C:
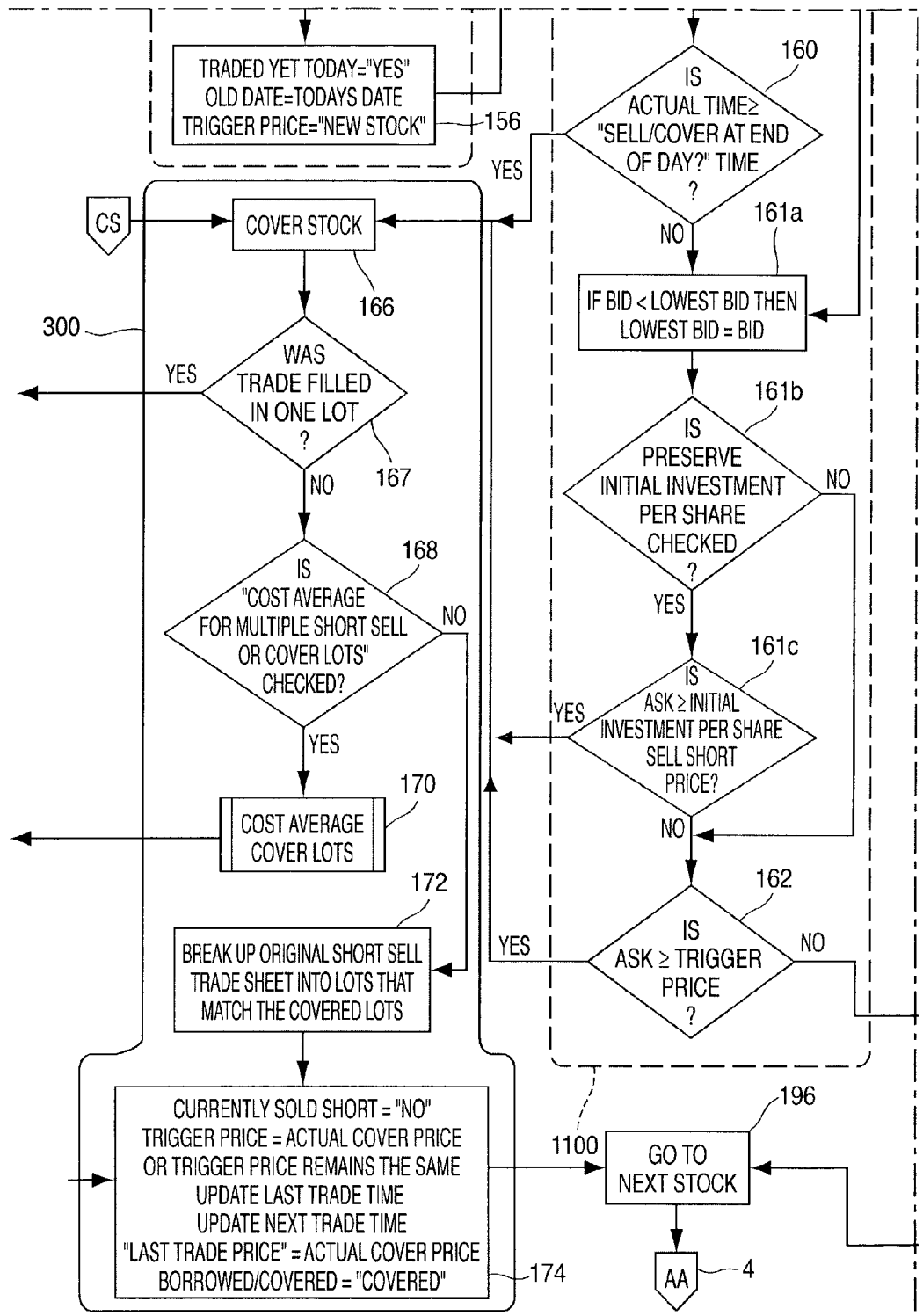
Figure 4D:
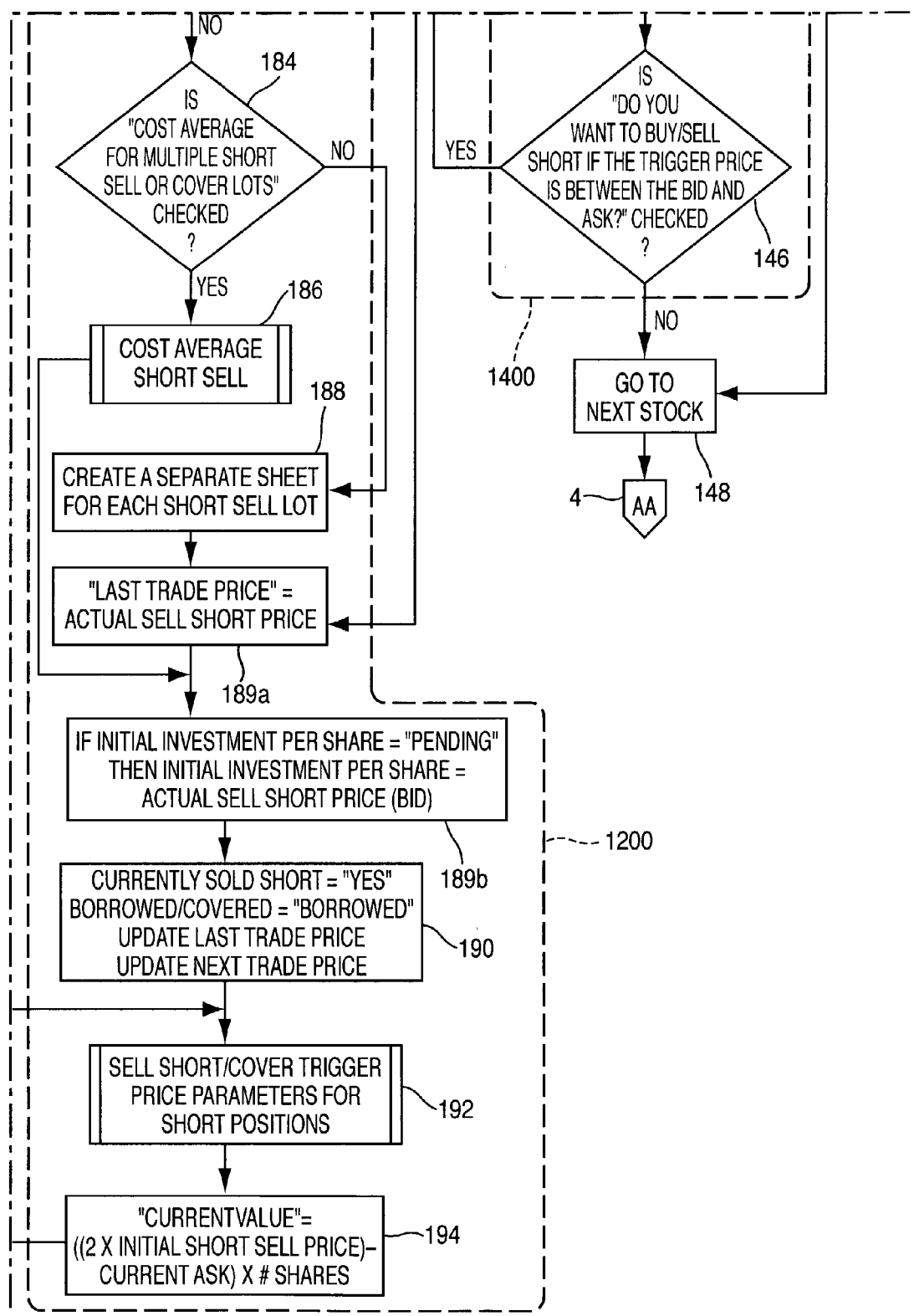
Figure 5A:
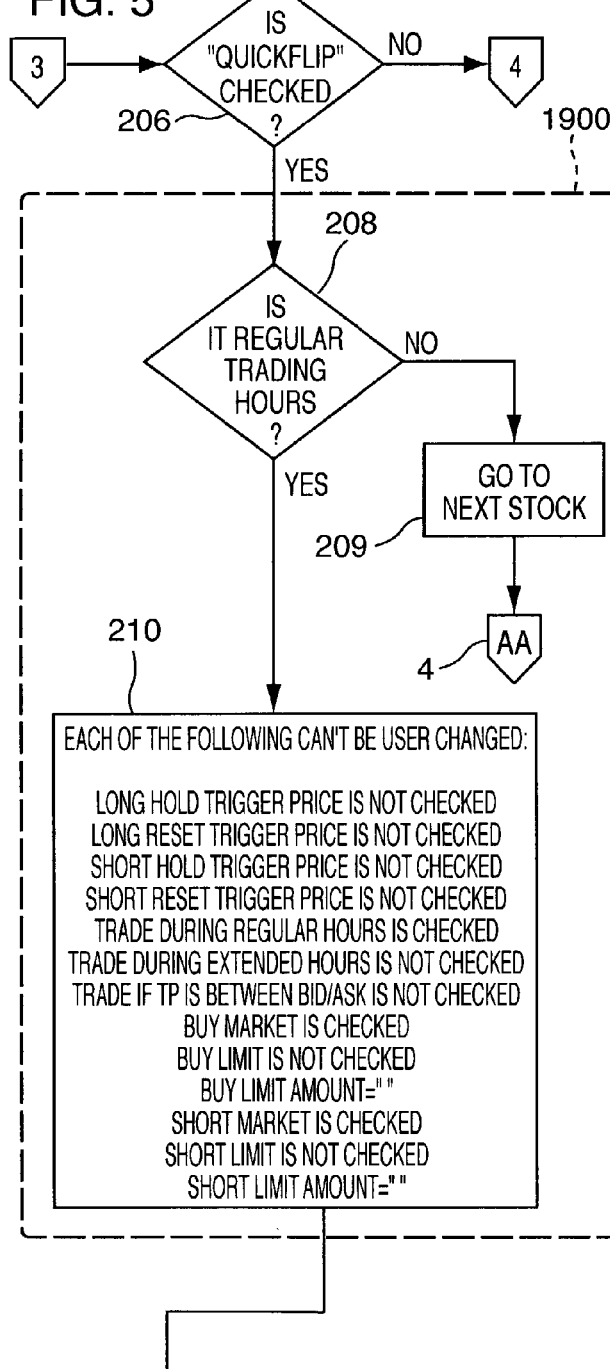
Figure 5A:
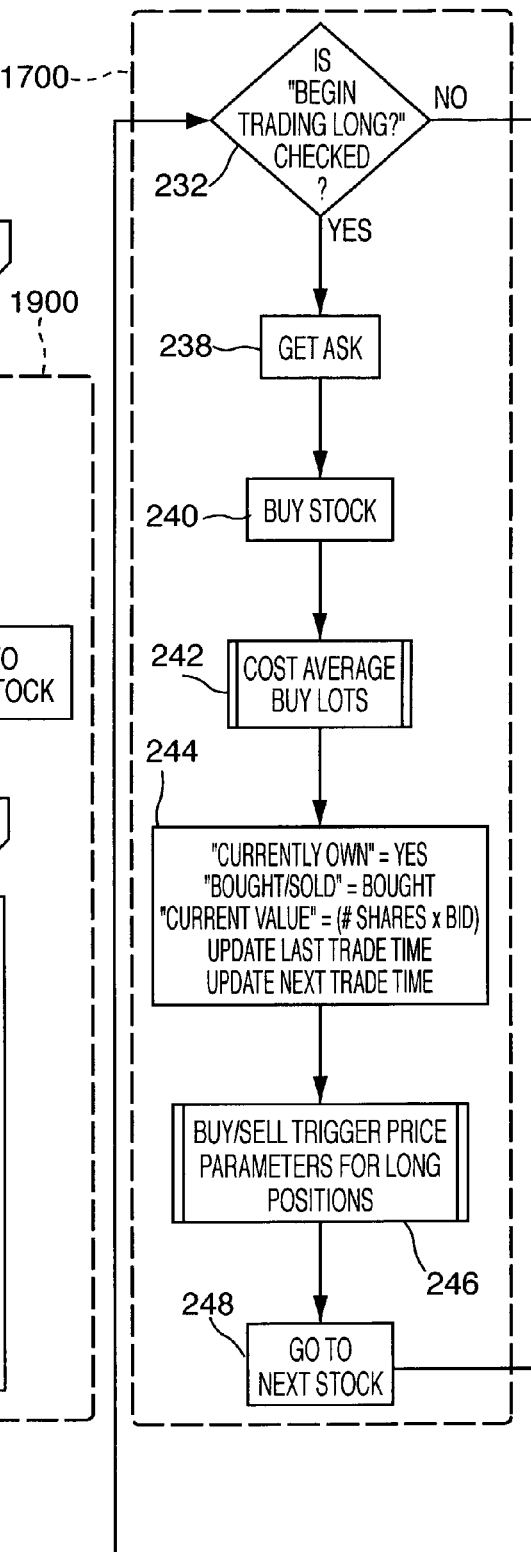
Figure 5B:
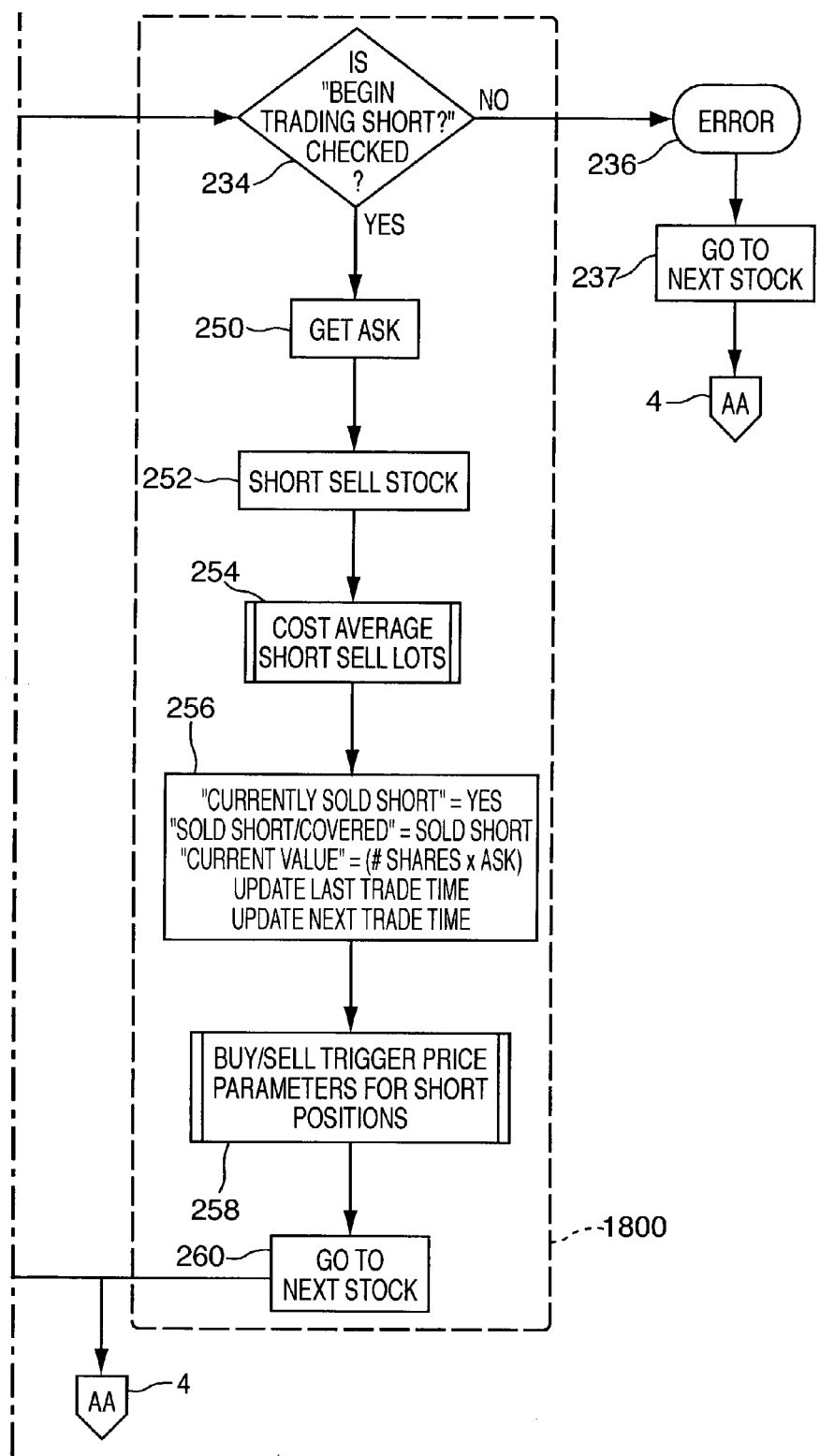
Figure 5C:
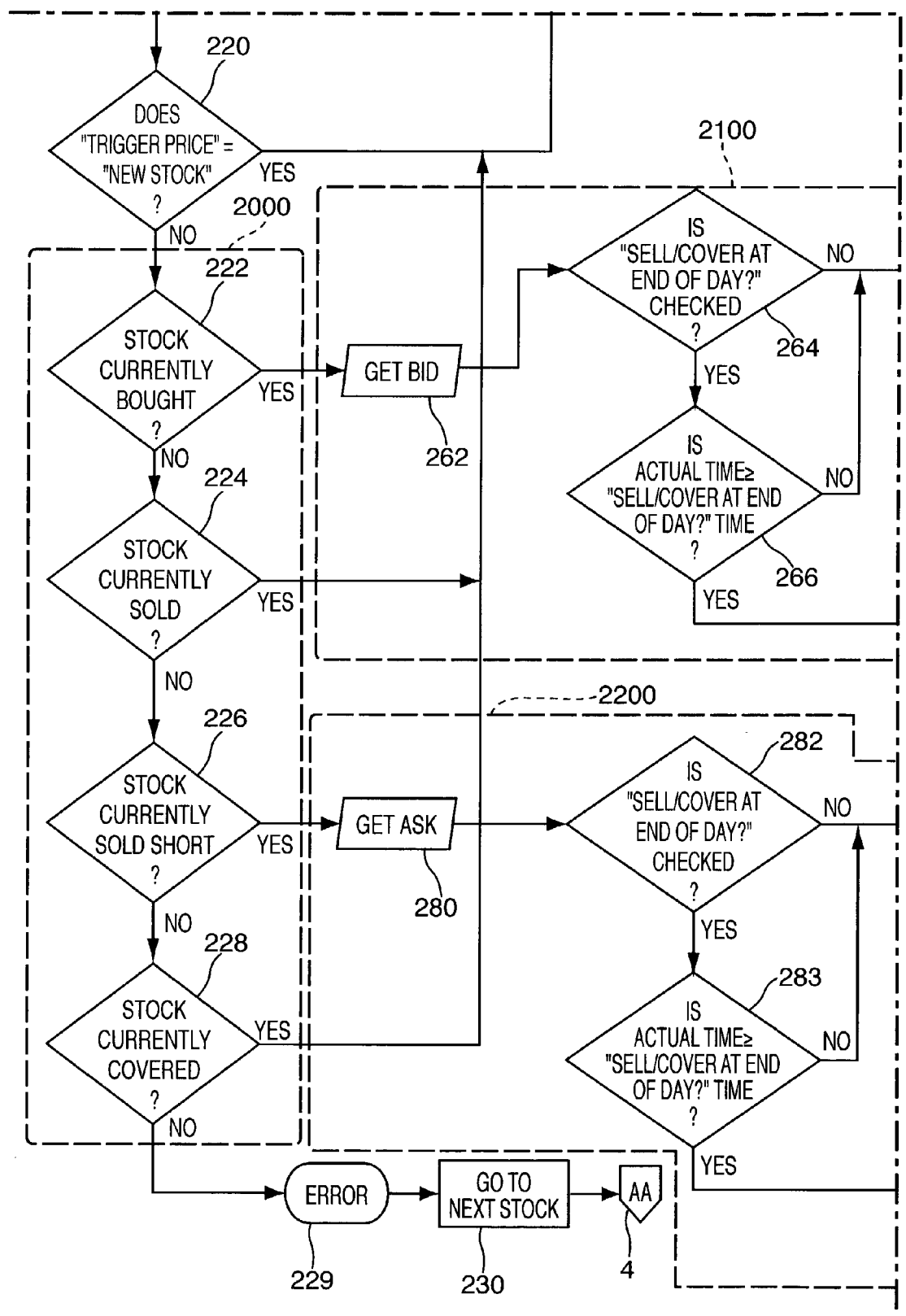
Figure 5D:
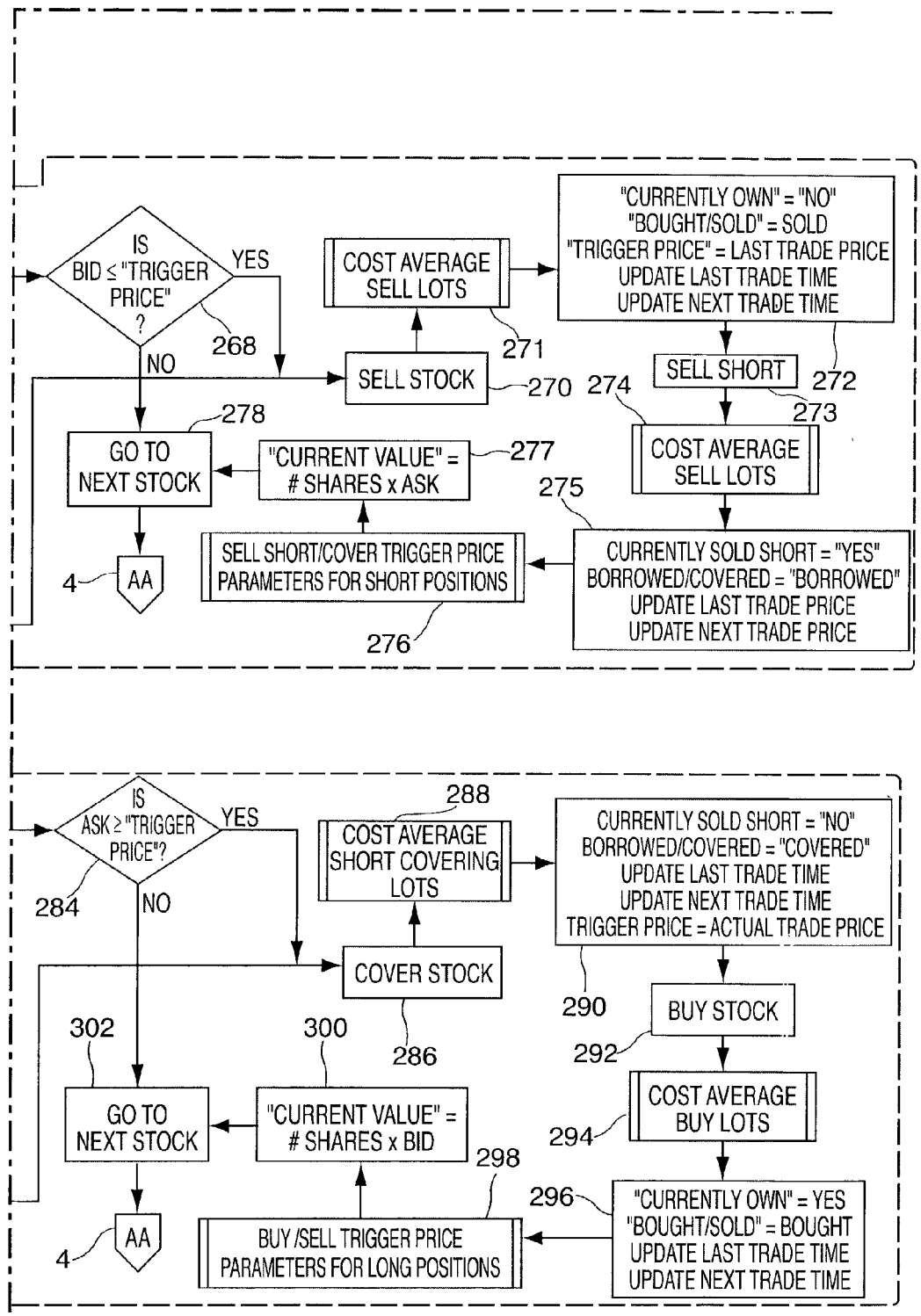

As mentioned above, the short market portion of the program shown in FIG. 4 works similarly to the buy market portion of the program except that the short market portion tracks the lowest bid (the reference price), not the highest ask. The difference in the short market portion is that the program tracks the current market bid price of the stock until the program calculated trigger price is reached or surpassed in the positive direction. When this occurs, the program takes the user out of the position by covering the stock. Referencing FIG. 4, which is a flowchart of the short market portion of the program, decision block 1600 is analogous to decision block 900 of FIG. 3 and the program determines whether the stock has already been traded on the day it is to be traded; decision block 1100 is analogous to decision block 800; decision block 1200, where the bid/asking prices are obtained and analyzed, is analogous to decision block 600; decision block 1300 is analogous to decision block 700; decision block 1400 where the short stock is covered is analogous to decision block 1000; and computer block 189a is analogous to computer block 64 and the trigger price is recalculated.

As mentioned previously, the QuickFlip feature allows the program to alternate its trading strategy, i.e., from long to short, short to long, etc. If the user established a long position and a trigger price is reached, the program ends the user's long position and automatically puts the user in a short position. After the trigger price for the short position is reached and stock is traded, the program automatically puts the user in a long position. This cycle continues until the user deactivates the QuickFlip option.

The particular program steps are detailed with reference to FIG. 5, in which the user has the option of selecting QuickFlip 206, field 2415. When QuickFlip is selected by the user in field 2415, decision block 1900 is followed first. In decision block 1900, the trading hours are analyzed. If the stock is to be traded during regular market hours, the program then proceeds from block 210 to block 220.

The program determines whether the trigger price is for a new stock, block 220. After setting the values found in block 210, decision block 2000 is performed if the trigger price is not for a new stock.

Decision block 2000 is performed if the trigger price is not for a new stock. Decision block 1700 is performed if the trigger price is for a new stock that the user wants to start trading long and 1800 for a new stock that the user wants to start trading.

Returning to decision block 2000, if the stock is currently owned 222, the program moves along to decision block 2100 to determine whether market conditions warrant selling the stock. In decision block 2100, either the stock is sold short or no sale occurs and the program proceeds to the next stock 278. In another scenario, when the shares of stock are currently being neither bought 222 nor sold 224, but sold short 226, decision block 2200 is next. In decision block 2200, the stock is covered 286 and bought 292, or the stock is not traded in the event that the trigger price is higher than the asking price 284, prior to advancing to the next stock 302.

Alternatively, if decision block 1700 is performed, when the user has selected to trade stock long, the program proceeds to buy the stock 240 and calculate the statistics of the trade 242, 244, 246, 248 before the next stock is looked at 260. Or, should the user have decided to trade stock short 234 instead of trading stock long 232, decision block 1800 is executed. In decision block 1800, stock is sold short 252 and the statistics of the trade are calculated 254, 256, 258. The program then moves to the next stock to be traded 260.

In decision block 2100, if stock is currently being bought 222, the program will get the bid 262. When the bid is less than or equal to the trigger price 268, the program proceeds to sell stock 270, sells it short 273, and the last trade price equals the actual ask price 277. The program then proceeds to the next stock 278. However, after getting the bid 262, if the bid is not less than or equal to the trigger price 268, the program proceeds to the next stock 278.

When moving to the next stock 230, 248, 260, 278, 302 the program goes to block AA 4, found in FIG. 2, which is the beginning of the program.

For decision block 2200, if at block 226, the stock is currently being sold short, the program gets the asking price 280. The stock is covered 286 and purchased 292 when the asking price is greater than or equal to the trigger price 284. The last trade price will equal the actual buy price 300 and the program examines the next stock 286. But, if the ask price is not greater than or equal to trigger price, the program moves onto the next stock 302. Again, this means that the program proceeds to AA 4.

Regarding decision block 1700, should the trigger price be for new stock 220, the program looks to see if the user has selected to begin trading long 232. If this option is selected, the program gets the asking price 238 and buys the stock 240. Next, the statistics are calculated 242, 244, 246. After calculating the statistics, the program proceeds to the next stock 248.

If begin long trading 232 is not selected, and begin trading short is selected 234, the program proceeds to get the bid 250 and sell the stock short 252, as found in decision block 1800. The statistics are then calculated 254, 256, 258. The program then moves onto the next stock 264. An error message 236 will appear if the user has not selected to begin trading long and also has not selected to begin trading short.

When the user has not selected QuickFlip, the user has to instruct the program to either stop trading the stock, field 2427, or immediately close out the stock position if currently holding a position, field 2429. FIG. 6 is the schematic representation of how the program proceeds according to the user's instructions.

If the user chooses to immediately trade the stock, decision block 2250 is followed. In decision block 2250, the stock is either sold S, covered CS, or neither, i.e., the program moves along to the next stock 406.

Alternatively, if the user selected to have the program stop trading the stock 408, the program proceeds to the next stock 410. Should the user fail to instruct the program by not making a selection in either fields 2427 or 2429, an error message 412 will appear.

When a user owns more than one share of one stock, he has the option of selling the stock in lots over time or selling the stock all at once 58, 102. The user may also have the option of not trading any of the shares.

FIG. 7 shows schematically how the program trades stocks in lots. The lots are calculated by either cost averaging buy lots 304, cost averaging sell lots 310, cost averaging short sell lots 316, or cost averaging short covering lots 322. After calculating the appropriate values, the program either proceeds to block 108 or 190 depending on what portion of the program the cost average lots are being calculated for.

The program can either cost average buys/sells or short sells/cover. This works in either of two ways. In the first way, the program sets up new screens for a specified number of the shares for each screen. The trigger price is adjusted to reflect the shares associated with the corresponding screens. In the second way, the program averages the prices and bundles the prices back to the amount of shares that were sold.

For example, suppose a user wants to sell 100 shares of stock. Fifty shares are sold for $172.00 per share, thirty shares for $171.98, and twenty shares for $171.95. Using the first method, the program has three separate screens for the corresponding amount of shares: Fifty, thirty, and twenty shares. Using the second method, the program groups all of the 100 shares back together and averages the cost so that it would be $171.98 per share, allowing only one screen to be needed.

Figure 8:
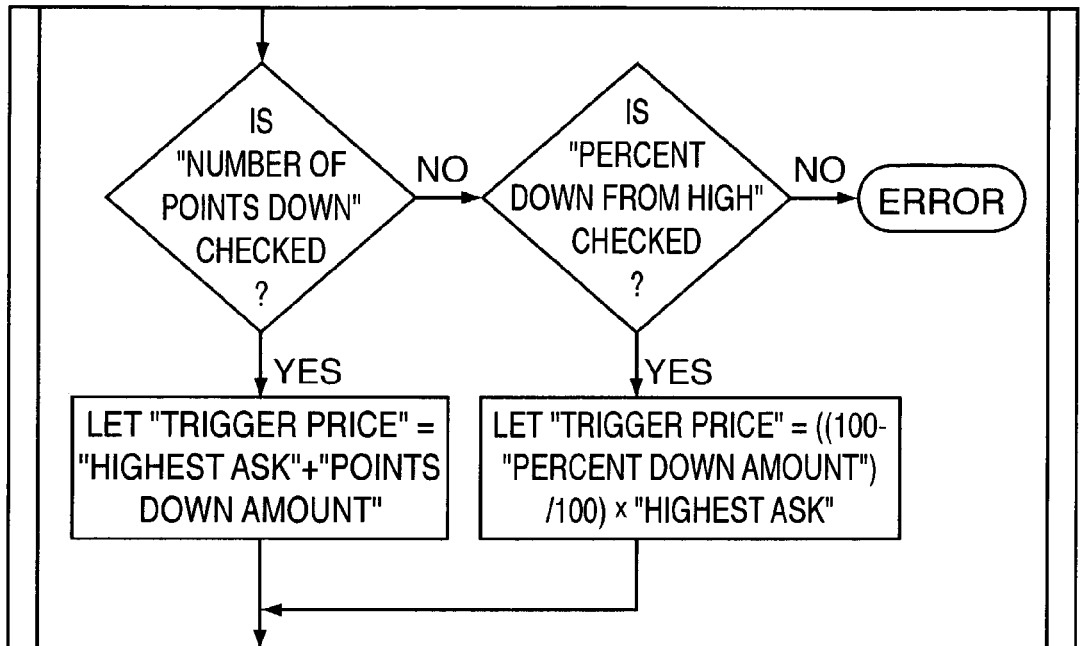
FIG. 8 shows the method for determining the trigger price parameters.
Figure 8:
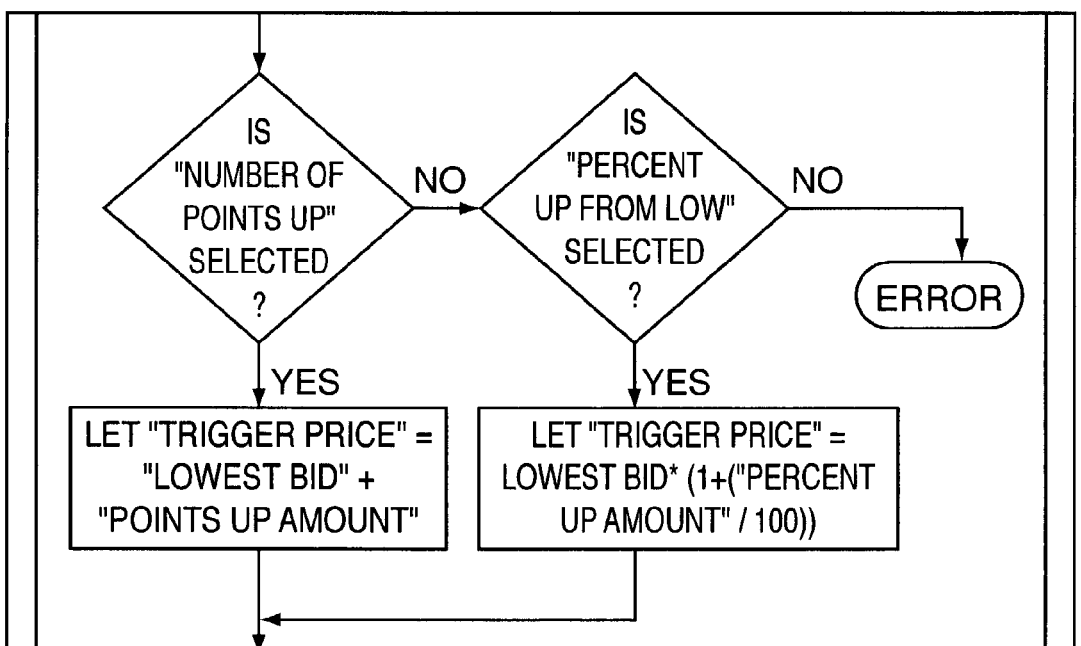

Blocks 70 and 192, in FIGS. 3 and 4, respectively, determine the trigger price parameters for long and short positions, respectively. FIG. 8 shows the method the program uses to calculate these parameters.

Figure 9:
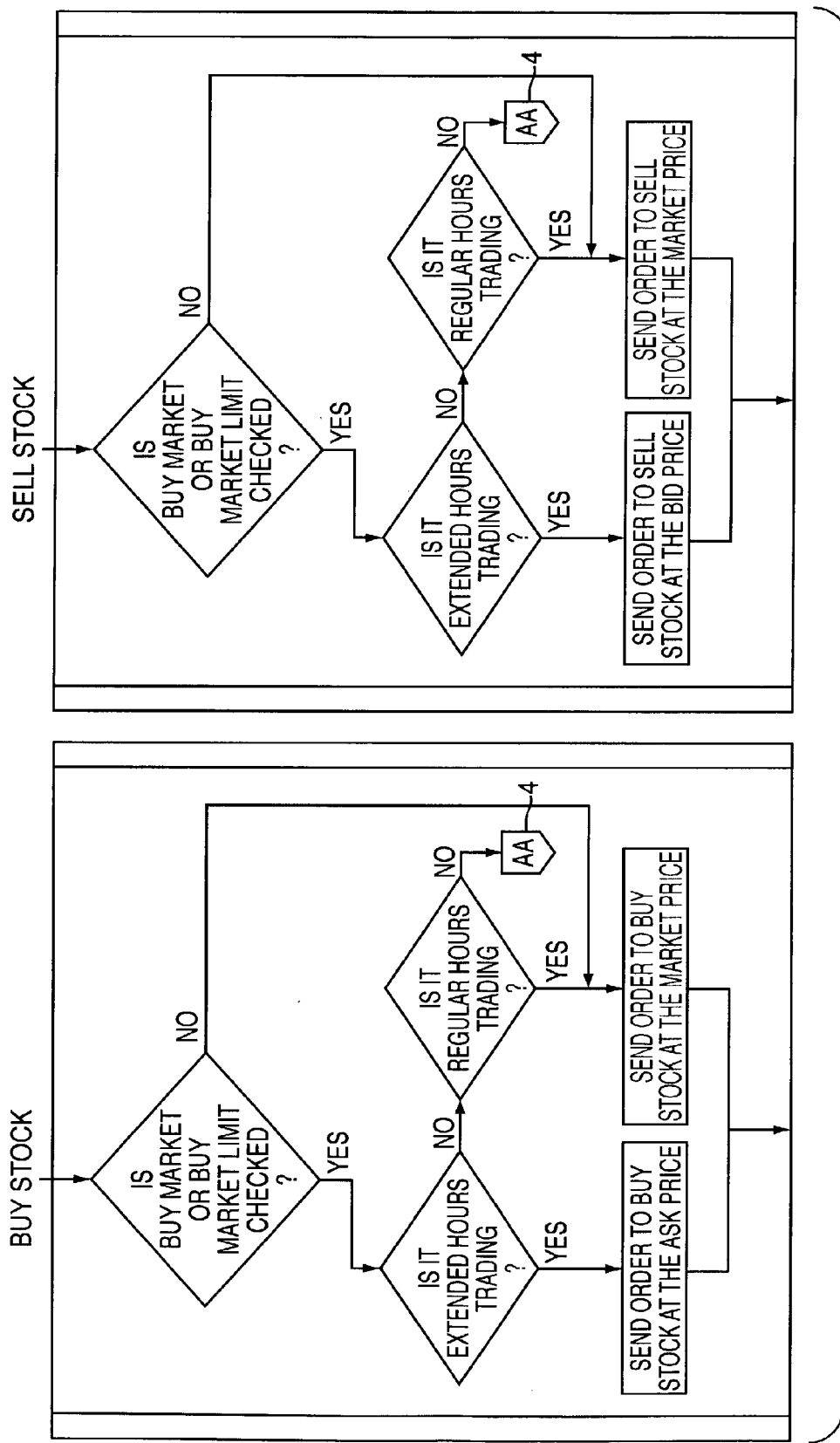
FIG. 9 represents the steps the inventive program utilizes to buy or sell stock.

In FIGS. 3–5, stock is bought and sold. A detailed description of the procedure used to perform the steps of buying and selling stock appears in FIG. 9.

Figure 10:
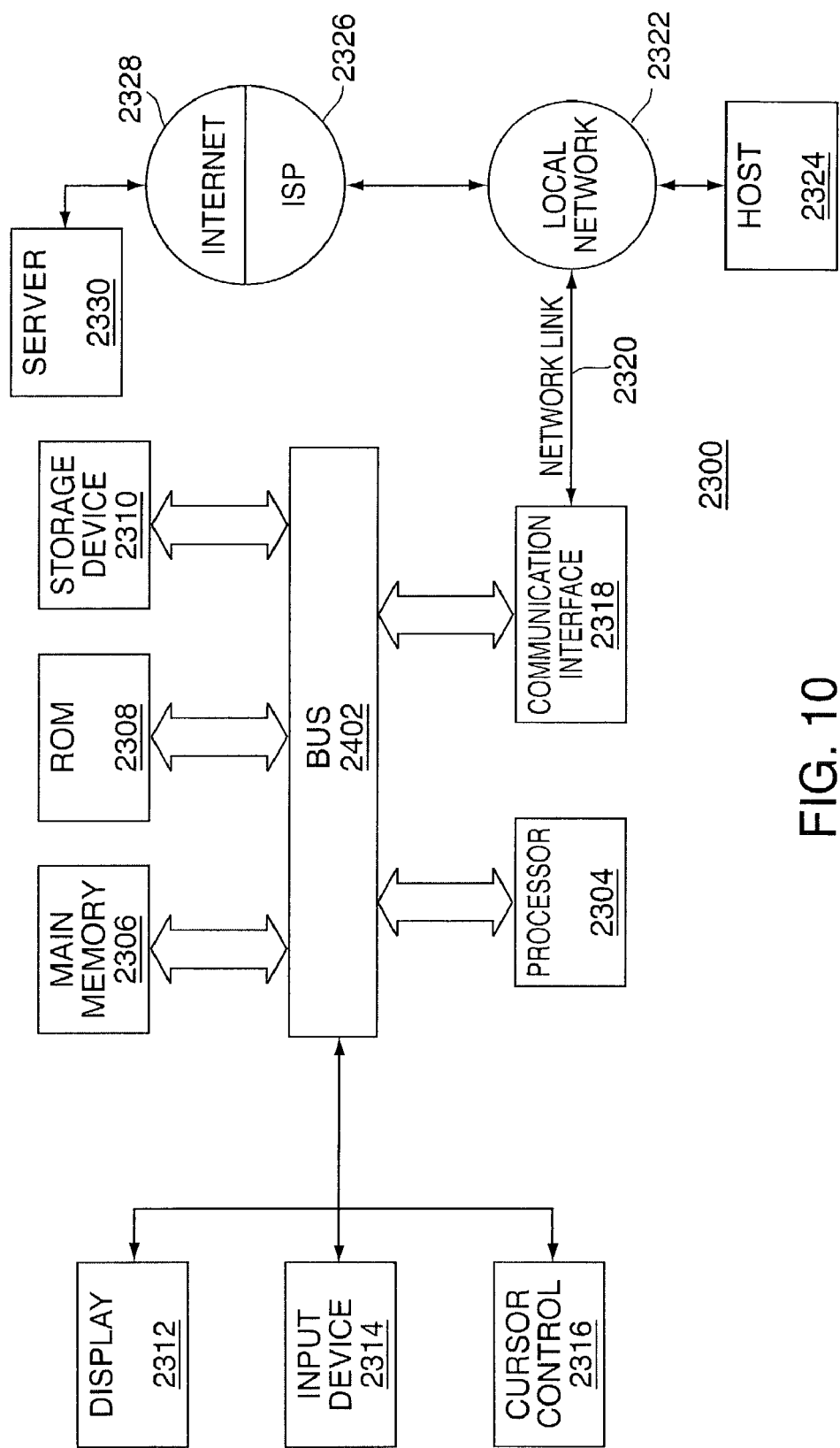
FIG. 10 is a block diagram representing a computer system.

FIG. 10 is a block diagram that illustrates a computer system 2300 upon which an embodiment of the invention may be implemented. Computer system 2300 includes a bus 2302 or other communication mechanism for communicating information and a processor 2304 coupled with bus 2302 for processing information. Computer system 2300 also includes a main memory 2306, such as a random access memory (RAM) or other dynamic storage device, coupled to bus 2302 for storing information and instructions to be executed by processor 2304. Main memory 2306 also may be used for storing temporary variable or other intermediate information during execution of instructions to be executed by processor 2304. Computer system 2300 further includes a read only memory (ROM) 2308 or other static storage device coupled to bus 2302 for storing static information and instructions for processor 2304. A storage device 2310, such as a magnetic disk or optical disk, is provided and coupled to bus 2302 for storing information and instructions.

Computer system 2300 may be coupled via bus 2302 to a display 2312, such as a cathode ray tube (CRT), for displaying information to a computer user. An input device 2314, including alphanumeric and other keys, is coupled to bus 2302 for communicating information and command selections to processor 2304. Another type of user input device is cursor control 2316, such as a mouse, a trackball, or cursor direction keys for communicating direction information and command selections to processor 2304 and for controlling cursor movement on display 2312. This input device typically has two degrees of freedom in two axes, a first axis (e.g., x) and a second axis (e.g., y), that allows the device to specify positions in a plane.

According to one embodiment of the invention, trading stock is provided by computer system 2300 in response to processor 2304 executing one or more sequences of one or more instructions contained in main memory 2306. Such instructions may be read into main memory 106 from another computer-readable medium, such as storage device 2310. Execution of the sequences of instructions contained in main memory 2306 causes processor 2304 to perform the process steps described herein. One or more processors in a multi-processing arrangement may also be employed to execute the sequences of instructions contained in main memory 2306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2304 for execution. Such a medium may take many forms, including, but not limited to, non-volatile media, volatile media, and transmission media. Non-volatile media include, for example, optical or magnetic disks, such as storage device 2310. Volatile media include dynamic memory, such as main memory 2306. Transmission media include coaxial cables, copper wire, and fiber optics, including the wires that comprise bus 2302. Transmission media can also take the form of acoustic or light waves, such as those generated during radio frequency (RF) and infrared (IR) data communications. Common forms of computer-readable media include, for example, floppy disk, a flexible disk, hard disk, magnetic tape, and other magnetic medium, a CD-ROM, DVD, any other optical medium, punch cards, paper tape, any other physical medium with patterns of holes, a RAM, a PROM, an EPROM, a FLASHEPROM, any other memory chip or cartridge, a carrier wave as described hereinafter, or any other medium from which a computer can read.

Various forms of computer-readable media may be involved in carrying one or more sequences of one or more instructions to processor 2304 for execution. For example, the instructions may initially be borne on a magnetic disk of a remote computer. The remote computer can load the instructions into its dynamic memory and send the instructions over a telephone line using a modem. A modem local to computer system 2300 can receive the data on the telephone line and use an infrared transmitter to convert the data to an infrared signal. An infrared detector coupled to bus 2302 can receive the data carried in the infrared signal and place the data on bus 2302. Bus 2302 carries the data to main memory 2306, from which processor 2304 retrieves and executes the instructions. The instructions received by main memory 106 may optionally be stored on storage device 2310 either before or after execution by processor 2304.

Computer system 2300 also includes a communication interface 2318 coupled to bus 2302. Communication interface 2318 provides a two-way data communication coupling to a network link 2320 that is connected to a local network 2322. For example, communication interface 2318 may be an integrated services digital network (ISDN) card or a modem to provide a data communication connection to a corresponding type of telephone line. As another example, communication interface 2318 may be a local area network (LAN) card to provide a data communication connection to a compatible LAN. Wireless liiks may also be implemented. In any such implementation, communication interface 2318 sends and receives electrical, electromagnetic, or optical signals that carry digital data streams representing various type of information.

Network link 2320 typically provides data communication through one or more networks to other data devices. For example, network link 2320 may provide a connection through local network 2322 to a host computer 2324 or to data equipment operated by an Internet Service Provider (ISP) 2326. ISP 2326 in turn provides data communication services through the worldwide packet data communication network, now commonly referred to as the "Internet" 2328. Local network 2322 and Internet 2328 both use electrical electromagnetic, or optical signals that carry digital data streams. The signals through the various networks and the signals on network link 2320 and through communication interface 2318, which carry the digital data to and from computer system 2300, are exemplary forms of carrier waves transporting the information.

Computer system 2300 can send messages and receive data, including program codes, through the network(s), network link 2320, and communication interface 2318. In the Internet example, a server 2330 might transmit a requested code for an application program through Internet 2328, ISP 2326, local network 2322, and communication interface 2318. In accordance with the invention, one such downloaded application provides for trading stock as described herein.

The received code may be executed by processor 2304 as it is received, and/or stored in storage device 2310, or other non-volatile storage for later execution. In this manner, computer system 2300 may obtain an application code in the form of a carrier wave.

The program can be modified so that the user specifies how much money he is willing to spend to purchase shares of stock. Suitable programming routines can monitor the money available to purchase stock, and if the available money decreases to an amount below that which is needed to purchase the desired number of shares, the user has the option to either not buy the shares or have the program purchase the greatest number of shares possible.

Another modification would be to have the program interface with at least one commercially available data source on the Internet to download stocks that either are the "most up" in the first few minutes of trading, have the greatest price movement together with high trading volume, or have any other desirable indicators, or combination of indicators that the program could use to automatically select a particular stock. The program could have suitable programming to find the stock with the "best fit" for the request and automatically add it to the user's stock portfolio and trade it based on the parameters set forth on the graphical user interface.

A further modification can allow the program to suggest minimum "Points Up," "Points Down," "Percent Up," or "Percent Down" values in the trading parameters to decrease the number of potential trades. Suitable programming routines can calculate the difference in price between the bid and ask prices. A multiple of this difference in prices can be the suggested values. By suggesting this value, the trigger price will not be between the bid and ask prices when the program begins trading a stock.

Still, another modification to the program allows the program to automatically close out a previously selected (by the user or other predefined computer assisted parameter) position that is currently being traded in order to use money obtained by selling those shares to purchase a preselected (with defined trading parameters) stock when a user-specified condition occurs. For example, a user could direct the program to sell his shares of Intel stock and buy shares of Microsoft stock when the value of Microsoft stock decreases to $40.00.

The program can also be modified to run hypothetical predefined trading parameters. Such hypothetical predefined trading parameters may use historical data of price movements for a particular stock and compare the results against each other as well as the actual historical result. For instance, the changes in price for Intel stock from last year can be used for a hypothetical. The data obtained can be used to run the program while hold trigger price is selected. Next, the data can be run through the program when allow daily rent is selected and then when QuickFlip is selected for the same period to see which selection yielded a better return. The user can then compare the results obtained to the actual historical yield.

It is understood that the above-described embodiment has been presented for the purposes of illustration and description of the present invention. Alternative embodiments may be devised by those of ordinary skill in the art. Such alternatives, as well as others which skill or fancy may suggest, are considered to fall within the scope of the current invention, which is solely defined by the claims appended hereto.

What is claimed is:

1. A computer-implemented method executed on a computer of trading a position in a security which has a value and which is actually being traded, comprising the steps of:
   (A) entering, by way of human intervention, a trading time delay period in a range of from minutes to hours at a graphical user interface of said computer;
   (B) acquiring a first position in the security;
   (C) determining a reference price for the security at a first point in time;
   (D) monitoring the actual value of the security over a period of time;
   (E) receiving an input corresponding to a differential in said actual value of the security during said period of time, said differential being either the difference between said actual value and said reference price or a percentage change in said reference price;
   (F) determining a trigger price for the security as a function of said differential and said reference price;
   (G) outputting instructions to liquidate said first position in the security when said actual value of the security reaches or passes said trigger price moving in a first direction, step (G) being performed by said computer, and without human intervention, after the performance of steps (A)–(F);
   (H) continuing to monitor the actual value of the security after step (G);
   (I) determining when said actual value of the security first reaches or passes said trigger price moving in a second direction, said second direction being opposite said first direction;
   (J) waiting said trading time delay period after the performance of step (I) to avoid trading the security prematurely due to fluctuations of said actual value of the security around said trigger price; and
   (K) outputting instructions to reacquire a second position in the security, step (K) being performed by said computer, and without human intervention, after the performance of step (J).

2. The computer-implemented method of claim 1, wherein the security is stock, bonds, options, or derivatives.

3. The computer-implemented method of claim 1, further comprising the step of automatically resetting said trigger price as said actual value of the security fluctuates.

4. The computer-implemented method of claim 1, further comprising the step of calculating statistics for each security traded.

5. The computer-implemented method of claim 1, further comprising the step of:
   (L) outputting instructions to liquidate said first position in the security when a user's gain reaches a specified number of dollars, step (L) being performed by said computer, and without human intervention, before the performance of step (G).

6. The computer-implemented method of claim 1, wherein the security is traded in lots over time or all at once.

7. The computer-implemented method of claim 1, wherein the security is traded during extended hours.

8. The computer-implemented method of claim 1, wherein the security is traded long and short in alternating fashion.

9. The computer-implemented method of claim 1, wherein said trigger price is between a bid price and an ask price, when said bid price is different from said ask price, or is equal to said bid price and said ask price, when said bid price is the same as said ask price.

10. The computer-implemented method of claim 1, further comprising the step of automatically acquiring at least one share of another security when a user-specified condition occurs, but after the performance of step (G).

11. The computer-implemented method of claim 1, wherein said reference price is one of the security's highest ask price when trading long and the security's lowest bid price when trading short.

12. The computer-implemented method of claim 1, wherein said trigger price is determined as a linear function of said differential and said reference price.

13. The computer-implemented method of claim 12, wherein said trigger price is the sum of said reference price and said differential.

14. The computer-implemented method of claim 1, wherein said trigger price is based on a moving average value of the security over time.

15. The computer-implemented method of claim 14, wherein said moving average value of the security is based on a 50 day time period.

16. The computer-implemented method of claim 15, wherein said moving average value of the security is based on a 100 day time period.

17. The computer-implemented method of claim 1, wherein said trigger price is based on the Price/Earnings ratio of the security.

18. The computer-implemented method of claim 1, further comprising the step of:

(L) outputting instructions to liquidate a first position in the security when a specified trade volume is reached, step (L) being performed by said computer, and without human intervention, before the performance of step (G).

19. The computer-implemented method of claim 1, further comprising the step of:
(L) outputting instructions to liquidate a first position in the security before, on, or after the date that the earnings announcement of a company associated with the security has occurred, step (L) being performed by said computer, and without human intervention, but before the performance of step (G).

20. The computer-implemented method of claim 1, wherein said period of time commences at said first point in time.

21. The computer-implemented method of claim 1, wherein said period of time expires after a second point in time.

22. The computer-implemented method of claim 1, wherein said period of time expires after step (K).

23. The computer-implemented method of claim 1, wherein said first position is long and said first direction is a direction in which the actual value of the security is increasing.

24. The computer-implemented method of claim 1, wherein said first position is short and said first direction is a direction in which the actual value of the security is decreasing.

25. A computer-readable medium carrying one or more sequences of instructions for trading a position in a security which has a value and which is actually being traded, wherein execution of the one of more sequences of instructions by one or more processors causes the one or more processors to perform the steps of:
(A) entering by way of human intervention, a trading time delay period in a range of from minutes to hours at a graphical user interface of said one or more processors;
(B) acquiring a first position in the security;
(C) determining a reference price for the security at a first point in time;
(D) monitoring the actual value of the security over a period of time;
(E) receiving an input corresponding to a differential in said actual value of the security during said period of time, said differential being either the difference between said actual value and said reference price or a percentage change in said reference price;
(F) determining a trigger price for the security as a function of said differential and said reference price;
(G) outputting instructions to liquidate said first position in the security when said actual value of the security reaches or passes said trigger price moving in a first direction, step (G) being performed by said one or more processors, and without human intervention, after the performance of steps (A)–(F);
(H) continuing to monitor the actual value of the security after step (G);
(I) determining when said actual value of the security first reaches or passes said trigger price moving in a second direction, said second direction being opposite said first direction;
(J) waiting said trading time delay period after the performance of step (I) to avoid trading the security prematurely due to fluctuations of said actual value of the security around said trigger price; and
(K) outputting instructions to reacquire a second position in the security, step (K) being performed by said one or more processors, and without human intervention, after the performance of step (J).

26. The computer-readable medium of claim 25, wherein the security is stock, bonds, options, or derivatives.

27. The computer-readable medium of claim 25, further comprising the step of automatically resetting said trigger price as said actual value of the security fluctuates.

28. The computer-readable medium of claim 25, further comprising the step of calculating statistics for each security traded.

29. The computer-readable medium of claim 25, further comprising the step of:
(L) outputting instructions to liquidate said first position in the security when a user's gain reaches a specified number of dollars, step (L) being performed by said one or more processors, and without human intervention, before the performance of step (G).

30. The computer-readable medium of claim 25, wherein the security is traded in lots over time or all at once.

31. The computer-readable medium of claim 25, wherein the security is traded during extended hours.

32. The computer-readable medium of claim 25, wherein the security is traded long and short in alternating fashion.

33. The computer-readable medium of claim 25, wherein said trigger price is between a bid price and an ask price, when said bid price is different from said ask price, or is equal to said bid price and said ask price, when said bid price is the same as said ask price.

34. The computer-readable medium of claim 25, further comprising the step of automatically acquiring at least one share of another security when a user-specified condition occurs, but after the performance of step (G).

35. The computer-readable medium of claim 25, wherein said reference price is one of the security's highest ask price when trading long and the security's lowest bid price when trading short.

36. The computer-readable medium of claim 25, wherein said trigger price is determined as a linear function of said differential and said reference price.

37. The computer-readable medium of claim 36, wherein said trigger price is the sum of said reference price and said differential.

38. The computer-readable medium of claim 25, wherein said trigger price is based on a moving average value of the security over time.

39. The computer-readable medium of claim 38, wherein said moving average value of the security is based on a 50 day time period.

40. The computer-implemented method of claim 38, wherein said moving average value of the security is based on a 100 day time period.

41. The computer-readable medium of claim 25, wherein said trigger price is based on the Price/Earnings ratio of the security.

42. The computer-readable medium of claim 25, further comprising the step of:
(L) outputting instructions to liquidate a first position in the security when a specified trade volume is reached, step (L) being performed by said one or more processors, and without human intervention, before the performance of step (G).

43. The computer-readable medium of claim 25, further comprising the step of:
(L) outputting instructions to liquidate a first position in the security before, on, or after the date that the earnings announcement of a company associated with the security has occurred, step (L) being performed by said one or more processors, and without human intervention, but before the performance of step (G).

44. The computer-readable medium of claim 25, wherein said period of time commences at said first point in time.

45. The computer-readable medium of claim 25, wherein said period of time expires after a second point in time.

46. The computer-readable medium of claim 25, wherein said period of time expires after step (K).

47. The computer-readable medium of claim 25, wherein said first position is long and said first direction is a direction in which the actual value of the security is increasing.

48. The computer-readable medium of claim 25, wherein said first position is short and said first direction is a direction in which the actual value of the security is decreasing.

49. A computer program product for use with a graphics display device, said computer program product comprising a computer usable medium having computer readable program code executed on a computer for
  (A) entering, by way of human intervention, a trading time delay period in a range of from minutes to hours at a graphical user interface of said computer;
  (B) acquiring a first position in the a security;
  (C) determining a reference price for the security at a first point in time;
  (D) monitoring the actual value of the security over a period of time;
  (E) receiving an input corresponding to a differential in said actual value of the security during said period of time, said differential being either the difference between said actual value and said reference price or a percentage change in said reference price;
  (F) determining a trigger price for the security as a function of said differential and said reference price;
  (G) outputting instructions to liquidate said first position in the security when said actual value of the security reaches or passes said trigger price moving in a first direction, step (G) being performed by said computer, and without human intervention, after the performance of steps (A)–(F);
  (H) continuing to monitor the actual value of the security after step (G);
  (I) determining when said actual value of the security first reaches or passes said trigger price moving in a second direction, said second direction being opposite said first direction;
  (J) waiting said trading time delay period after the performance of step (I) to avoid trading the security prematurely due to fluctuations of said actual value of the security around said trigger price; and
  (K) outputting instructions to reacquire a second position in the security, step (K) being performed by said computer, and without human intervention, after the performance of step (J).

50. The computer program product of claim 49, wherein the security is stock, bonds, options, or derivatives.

51. The computer program product of claim 49, further comprising the step of automatically resetting said trigger price as said actual value of the security fluctuates.

52. The computer program product of claim 49, further comprising the step of calculating statistics for each security traded.

53. The computer program product of claim 49, further comprising the step of:
  (L) outputting instructions to liquidate said first position in the security when a user's gain reaches a specified number of dollars, step (L) being performed by said computer, and without human intervention, before the performance of step (G).

54. The computer program product of claim 49, wherein the security is traded in lots over time or all at once.

55. The computer program product of claim 49, wherein the security is traded during extended hours.

56. The computer program product of claim 49, wherein the security is traded long and short in alternating fashion.

57. The computer program product of claim 49, wherein said trigger price is between a bid price and an ask price, when said bid price is different from said ask price, or is equal to said bid price and said ask price, when said bid price is the same as said ask price.

58. The computer program product of claim 49, further comprising the step of automatically acquiring at least one share of another security when a user-specified condition occurs, but after the performance of step (G).

59. The computer program product of claim 49, wherein said reference price is one of the security's highest ask price when trading long and the security's lowest bid price when trading short.

60. The computer program product of claim 49, wherein said trigger price is determined as a linear function of said differential and said reference price.

61. The computer program product of claim 60, wherein said trigger price is the sum of said reference price and said differential.

62. The computer program product of claim 49, wherein said trigger price is based on a moving average value of the security over time.

63. The computer program product of claim 62, wherein said moving average value of the security is based on a 50 day time period.

64. The computer program product of claim 62, wherein said moving average value of the security over time is based on a 100 day time period.

65. The computer program product of claim 49, wherein said trigger price is based on the Price/Earnings ratio of the security.

66. The computer program product of claim 49, further comprising the step of:
  (L) outputting instructions to liquidate a first position in the security when a specified trade volume is reached, step (L) being performed by said computer, and without human intervention, before the performance of step (G).

67. The computer program product of claim 49, further comprising the step of:
  (L) outputting instructions to liquidate a first position in the security before, on, or after the date that the earnings announcement of a company associated with the security has occurred, step (L) being performed by said computer, and without human intervention, but before the performance of step (G).

68. The computer program product of claim 49, wherein said period of time commences at said first point in time.

69. The computer program product of claim 49, wherein said period of time expires after a second point in time.

70. The computer program product of claim 49, wherein said period of time expires after step (K).

71. The computer program product of claim 49, wherein said first position is long and said first direction is a direction in which the actual value of the security is increasing.

72. The computer program product of claim 49, wherein said first position is short and said first direction is a direction in which the actual value of the security is decreasing.

* * * * *